(12) United States Patent
Green

(10) Patent No.: US 7,552,445 B2
(45) Date of Patent: Jun. 23, 2009

(54) SYSTEMS AND METHODS FOR MONITORING EVENTS FROM MULTIPLE BROKERS

(75) Inventor: James D. Green, Oakton, VA (US)

(73) Assignee: Savvis Communications Corporation, Town & Country, MO (US)

( * ) Notice: Subject to any disclaimer, the term of this patent is extended or adjusted under 35 U.S.C. 154(b) by 562 days.

(21) Appl. No.: 10/318,025

(22) Filed: Dec. 13, 2002

(65) Prior Publication Data

US 2004/0117802 A1 Jun. 17, 2004

(51) Int. Cl.
G06F 9/44 (2006.01)
(52) U.S. Cl. ...................... 719/318; 709/224
(58) Field of Classification Search ................ 719/310, 719/315, 316, 318, 218, 220, 224; 709/218, 709/220, 224, 246; 716/5; 707/1, 104.1; 706/45
See application file for complete search history.

(56) References Cited

U.S. PATENT DOCUMENTS

| | | | | |
|---|---|---|---|---|
| 5,237,684 A | * | 8/1993 | Record et al. | 719/318 |
| 5,305,454 A | * | 4/1994 | Record et al. | 719/318 |
| 5,499,340 A | | 3/1996 | Barritz | |
| 5,530,868 A | * | 6/1996 | Record et al. | 719/318 |
| 5,612,898 A | | 3/1997 | Huckins | |
| 5,809,235 A | | 9/1998 | Sharma et al. | |
| 5,826,206 A | | 10/1998 | Nemeth | |
| 5,841,967 A | * | 11/1998 | Sample et al. | 714/33 |
| 5,867,659 A | | 2/1999 | Otteson | |
| 5,893,083 A | * | 4/1999 | Eshghi et al. | 706/45 |
| 6,092,102 A | | 7/2000 | Wagner | |
| 6,115,682 A | | 9/2000 | Omtzigt | |
| 6,202,044 B1 | * | 3/2001 | Tzori | 703/28 |
| 6,253,240 B1 | * | 6/2001 | Axberg et al. | 709/223 |
| 6,256,676 B1 | * | 7/2001 | Taylor et al. | 709/246 |
| 6,289,375 B1 | * | 9/2001 | Knight et al. | 709/217 |
| 6,336,119 B1 | * | 1/2002 | Banavar et al. | 707/104.1 |
| 6,336,139 B1 | | 1/2002 | Feridun et al. | |
| 6,523,027 B1 | * | 2/2003 | Underwood | 707/4 |
| 6,594,803 B1 | * | 7/2003 | Weber et al. | 716/5 |
| 6,640,244 B1 | * | 10/2003 | Bowman-Amuah | 709/207 |
| 6,704,803 B2 | * | 3/2004 | Wilson et al. | 719/315 |
| 6,714,976 B1 | * | 3/2004 | Wilson et al. | 709/224 |
| 6,735,772 B1 | * | 5/2004 | MacPhail | 719/315 |
| 6,751,657 B1 | * | 6/2004 | Zothner | 709/220 |
| 6,754,704 B1 | * | 6/2004 | Prorock | 709/224 |
| 6,782,541 B1 | * | 8/2004 | Cohen et al. | 719/318 |

(Continued)

OTHER PUBLICATIONS

"MyBEA Enterprise Infastructure Services Architecture", Oct. 2002, pp. 1-7.*

(Continued)

Primary Examiner—Van H Nguyen
(74) Attorney, Agent, or Firm—Kenyon & Kenyon LLP

(57) ABSTRACT

An event monitoring system includes a plurality of enterprise brokers; and an event monitor coupled to at least some of the enterprise brokers using a network. The event monitor receives data event information from enterprise brokers connected thereto, and generates an incoming events list including the data event information received from at least some of the enterprise brokers. The event monitor may maintain connections to at least some of the enterprise brokers. The event monitor may simulate the flow of simulated data events throughout an enterprise.

28 Claims, 20 Drawing Sheets

U.S. PATENT DOCUMENTS

| | | | |
|---|---|---|---|
| 6,789,257 B1 * | 9/2004 | MacPhail | 719/316 |
| 6,829,639 B1 * | 12/2004 | Lawson et al. | 709/224 |
| 6,865,599 B2 * | 3/2005 | Zhang | 709/218 |
| 6,871,224 B1 * | 3/2005 | Chu et al. | 709/224 |
| 7,062,749 B2 * | 6/2006 | Cyr et al. | 717/103 |
| 7,143,093 B1 * | 11/2006 | Bracho et al. | 707/10 |
| 2002/0016843 A1 | 2/2002 | Schweitzer et al. | |
| 2003/0093403 A1 * | 5/2003 | Upton | 707/1 |

OTHER PUBLICATIONS

Altiok et al "A Capacity Planning Tool For The Tuxedo Middleware Used In Transaction Processing Systems", 2001, pp. 502-507.*

"BEA WebLogic Enterprise 5.1", 2000 BEA Systems, pp. 1-4.*

"BEA TUXEDO Programmer's Guide", Feb. 1999.*

Tombros et al. "The Broker/Services Model For The Design Of Cooperative Process-Oriented Environments", Jun. 1997, pp. 1-15.*

Sloman "Network And Distributed Systems Management", 1994, pp. 309-347.*

Felt "Distributed Transaction Processing In The TUXEDO System", 1993 IEEE, pp. 266-267.*

Andrade "Open On-Line Transaction Processing With The TUXEDO System", 1992 IEEE, pp. 366-371.*

* cited by examiner

Fig. 4

Event Monitor Simulation - Circular Pattern

800

Event Monitor Broker: dgreen

Event Monitor Simulation

[date/time]

| Run | Publisher | Subscriber | Broker | RoundTrip Avg (ms) | First Leg Avg (ms) | Last Leg Avg (ms) | Msg Size | Total Threads |
|---|---|---|---|---|---|---|---|---|
| 1 | Event Monitor | clientNode1 | Huanbao | 3024 | 2944 | 80 | 500 | 1 |
| 1 | clientNode1 | clientNode2 | dgreen | 831 | 761 | 70 | 500 | 1 |
| 1 | clientNode2 | clientNode3 | dgreen | 481 | 331 | 150 | 500 | 1 |
| 2 | Event Monitor | clientNode1 | Huanbao | 4275 | 4012 | 263 | 500 | 10 |
| 2 | clientNode1 | clientNode2 | dgreen | 3319 | 2835 | 484 | 500 | 10 |
| 2 | clientNode2 | clientNode3 | dgreen | 1237 | 676 | 561 | 500 | 10 |
| 3 | Event Monitor | clientNode1 | Huanbao | 24424 | 24141 | 283 | 500 | 100 |
| 3 | clientNode1 | clientNode2 | dgreen | 19823 | 16970 | 2853 | 500 | 100 |
| 3 | clientNode2 | clientNode3 | dgreen | 10443 | 5891 | 4551 | 500 | 100 |
| 4 | Event Monitor | clientNode1 | Huanbao | 1542 | 1482 | 60 | 5000 | 1 |
| 4 | clientNode1 | clientNode2 | dgreen | 821 | 631 | 190 | 5000 | 1 |
| 4 | clientNode2 | clientNode3 | dgreen | 411 | 211 | 200 | 5000 | 1 |
| 5 | Event Monitor | clientNode1 | Huanbao | 3352 | 3127 | 224 | 5000 | 10 |
| 5 | clientNode1 | clientNode2 | dgreen | 2535 | 1698 | 837 | 5000 | 10 |
| 5 | clientNode2 | clientNode3 | dgreen | 1012 | 842 | 170 | 5000 | 10 |
| 6 | Event Monitor | clientNode1 | Huanbao | 27144 | 26967 | 176 | 5000 | 100 |
| 6 | clientNode1 | clientNode2 | dgreen | 20184 | 18191 | 1993 | 5000 | 100 |
| 6 | clientNode2 | clientNode3 | dgreen | 120034 | 2612 | 9422 | 5000 | 100 |

Event Monitor Simulation - Hub Pattern

1200

Event Monitor Broker: dgreen

Event Monitor Simulation
[date/time]

| Run (801) | Publisher (802) | Subscriber (803) | Broker (804) | RoundTrip Avg (ms) (805) | First Leg Avg (ms) (806) | Last Leg Avg (ms) (807) | Msg size (808) | Total Threads (809) |
|---|---|---|---|---|---|---|---|---|
| 1 | Event Monitor | clientNode1 | Huanbao | 2774 | 2584 | 190 | 500 | 1 |
| 1 | clientNode1 | clientNode3 | dgreen | 1091 | 841 | 250 | 500 | 1 |
| 1 | clientNode1 | clientNode2 | dgreen | 1422 | 1151 | 271 | 500 | 1 |
| 2 | Event Monitor | clientNode1 | Huanbao | 3557 | 3426 | 131 | 500 | 10 |
| 2 | clientNode1 | clientNode2 | dgreen | 1670 | 865 | 804 | 500 | 10 |
| 2 | clientNode1 | clientNode3 | dgreen | 2054 | 1209 | 845 | 500 | 10 |
| 3 | Event Monitor | clientNode1 | Huanbao | 33472 | 32554 | 918 | 500 | 100 |
| 3 | clientNode1 | clientNode3 | dgreen | 25901 | 14931 | 10969 | 500 | 100 |
| 3 | clientNode1 | clientNode2 | dgreen | 18156 | 9325 | 8830 | 500 | 100 |
| 4 | Event Monitor | clientNode1 | Huanbao | 1402 | 1202 | 200 | 5000 | 1 |
| 4 | clientNode1 | clientNode2 | dgreen | 511 | 270 | 241 | 5000 | 1 |
| 4 | clientNode1 | clientNode3 | dgreen | 811 | 611 | 200 | 5000 | 1 |
| 5 | Event Monitor | clientNode1 | Huanbao | 2863 | 2733 | 130 | 5000 | 10 |
| 5 | clientNode1 | clientNode2 | dgreen | 1281 | 461 | 820 | 5000 | 10 |
| 5 | clientNode1 | clientNode3 | dgreen | 1415 | 693 | 721 | 5000 | 10 |
| 6 | Event Monitor | clientNode1 | Huanbao | 25894 | 25755 | 139 | 5000 | 100 |
| 6 | clientNode1 | clientNode2 | dgreen | 16234 | 9840 | 6394 | 5000 | 100 |
| 6 | clientNode1 | clientNode3 | dgreen | 17840 | 10085 | 7754 | 5000 | 100 |

*Fig. 12*

SYSTEMS AND METHODS FOR MONITORING EVENTS FROM MULTIPLE BROKERS

This disclosure contains information subject to copyright protection. The copyright owner has no objection to the facsimile reproduction by anyone of the patent disclosure or the patent as it appears in the U.S. Patent and Trademark Office files or records, but otherwise reserves all copyright rights whatsoever.

BACKGROUND OF THE INVENTION

1. Field of the Invention

Embodiments of the present invention relate generally to event monitoring and, more particularly, to automated systems and methods for enterprise event monitoring.

2. General Background and Description of Related Art

Many business organizations have adopted or are moving toward an enterprise-wide view of disparate business functions, operations, and applications. The advent of networked computing systems made possible by, among other things, the Internet, has provided a means by which business organizations may choose to reengineer and/or integrate business processes which previously may have been isolated within a particular function or geographic location. Accordingly, one business trend has arisen of providing visibility into standalone software and system applications across many suborganizations throughout the entire business enterprise regardless of geographic location. An enterprise may therefore include the multiple geographically dispersed computing systems that support various functions of a common organization or group, such as a business organization (e.g., company, corporation, joint venture, etc.).

In order to integrate various the business processes across an enterprise using this approach, the individual applications may share results and data. As these individual applications may include standalone and legacy applications having unique, proprietary, or incompatible message and data formats, the need has arisen for methods and systems that can mediate or adapt the different data formats used by one application for use by one or more other applications. Enterprise brokers have been developed to provide this functionality. An enterprise broker may include an adapter capability for each enterprise application that needs to exchange information with one or more other enterprise applications. The adapter capability may include mediation software, also known as middleware, to convert information from one application format to another in order to provide inter-application communication and passing of information transparently to the applications. Inter-application messages that include the exchanged application information may flow through and be managed by one or more enterprise brokers. These messages may be referred to as data events.

In the development and troubleshooting of enterprise integration systems, it is often required to investigate the source, destination, and intermediate routing of data event messages flowing throughout the enterprise. For example, technical personnel may need to investigate and resolve problems involving data event timing or synchronization among applications. Data event monitoring systems may be useful for real-time monitor and historical or post-mortem review of data event flow throughout the enterprise in support of this need.

Furthermore, communication of data events between enterprise applications or nodes may occur under a variety of topologies. One example of a communication topology is the circular pattern, in which each enterprise node is connected to two other nodes to form a circular communication path. In the circular pattern, inter-application data events may be passed by each intermediate node until the data event message reaches the destination node. Another example of a communication topology is the hub pattern, in which each enterprise node is connected to a single hub node that routes all data event message traffic. For any given enterprise, the sizes, types, and frequencies of data event messages are variable. Due to these factors at least, data event message latency time will be affected by the type of communication topology chosen.

BRIEF DESCRIPTION OF THE DRAWINGS

The present invention will be readily appreciated and understood from consideration of the following detailed description of at least one embodiment of this invention, when taken with the accompanying drawings, in which same numbered elements are identical and:

FIG. 4 is an example of a browser formatted monitor page output to a user in accordance with embodiments of the invention;

FIG. 8 shows an example of a simulation report showing propagation times for simulated events according to a circular topology in accordance with embodiments of the invention;

FIG. 12 shows an example of a simulation report showing propagation times for simulated events according to a hub topology in accordance with embodiments of the invention;

DETAILED DESCRIPTION OF THE EMBODIMENTS

In accordance with at least one embodiment of the invention, a system and method for monitoring events is provided. Embodiments of the present system and method may utilize a computer-based event monitor, and may further include an event flow simulator. In various embodiments, one or more portions of the systems and methods described herein may be fully or partially automated using a computer or computers executing a sequence of programmed instructions. Systems and methods that permit comparative evaluation among various topologies are therefore useful for selecting a preferred topology as well as fine tuning an existing topology in order to optimize the data event message flow throughout the enterprise.

Figure 1:
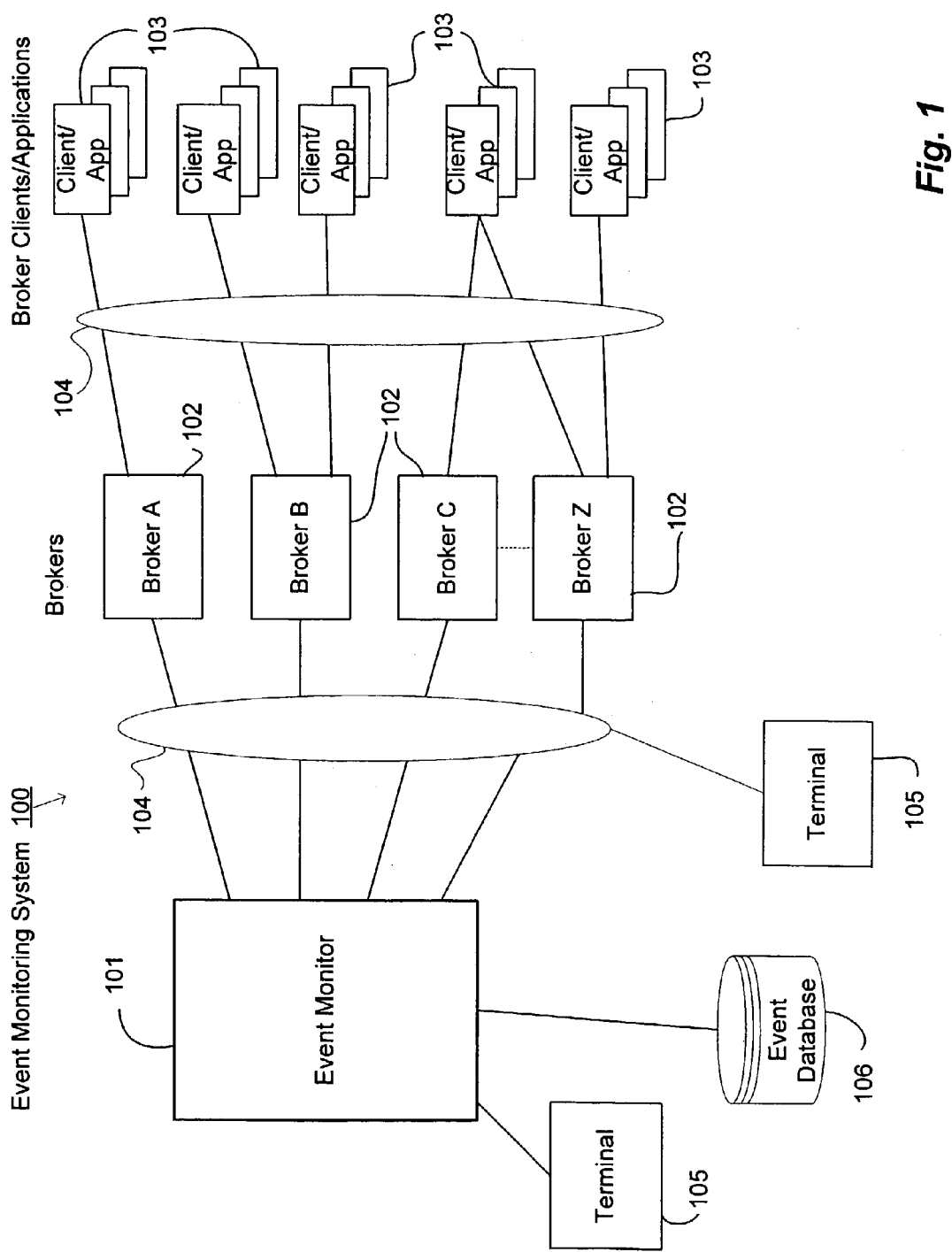
FIG. 1 is an illustrative block diagram of a system implementing or employed by the event monitoring system in accordance with at least one embodiment of the invention.

FIG. 1 is a functional block diagram of an event simulation system 100 in accordance with at least one embodiment of the present invention. Referring now to FIG. 1, the event monitoring system 100 may include an event monitor 101, one or more brokers 102, one or more broker clients/applications 103, at least one terminal 105, and an event database 106. The event monitor 101 may be coupled to each of or a subset of the brokers 102 using a network 104. Each broker client/application 103 may be coupled to at least one of the brokers 102 using the network 104. The event monitor 101 may be further coupled to at least one terminal 105 using the network 104.

The network 104 may be one or more public and/or private networks. In at least one embodiment, the network 104 may be a packet-based messaging network such as, but not limited to, a Transmission Control Protocol/Internet Protocol (TCP/IP) based network. In such embodiments, the TCP/IP based network 104 may be implemented using or involve a Local Area Network (LAN), Wide Area Network (WAN), the Internet, or an Intranet, for example, or any combination thereof. All or a portion of the network 104 may be implemented using a variety of transmission media such as, but not limited to, landline, telephone, cable, or wireless link. In the exemplary TCP/IP based embodiments, the event monitor 101, each broker 102, each broker client/application 103, and each terminal 105 may each have a unique IP address. Furthermore, the network 104 may include transmission security such as, but not limited to, a Secure Socket Layer (SSL). Alternatively, or in addition, encryption may be used to provide transmission privacy and/or source and destination authentication. Such encryption may use a Pretty Good Privacy (PGP) based application, or other public key cryptographic scheme.

In at least one embodiment, the broker 102 may be implemented using an enterprise broker supplied by WebMethods® Inc. of Fairfax, Va. The broker 102 may further include an Application Program Interface (API) to facilitate application development and communication with the broker 102. The API may further include a Java API provided by WebMethods®. Further, the broker 102 may include the WebMethods® Event Tracker® application that executes at the broker 102.

Broker client/applications 103 may include systems and applications supporting various functions throughout the business enterprise including, for example, purchase order processing, inventory management, shipment or invoice tracking, and supply chain management, as well as backend processes such as payroll processing. One or more of these business functions may be accomplished using, or with the aid of, automated systems and components such as a computing system. The computing system supporting each broker/client application 103 may be, for example, a single computing platform such as a personal computer or workstation, or may be two or more networked computing platforms. Networked computing platforms may include one or more servers providing application and data access for one or more client computing platforms.

In at least one embodiment, all or a portion of the broker client/application 103 computing systems of the enterprise may communicate with the enterprise broker 102 via the network 104. The enterprise broker 102 may mediate inter-application and inter-process communication among the broker client/applications 103 in order to facilitate and synchronize the coherent and consistent flow of data throughout the enterprise. This enterprise broker 102 functionality may be implemented using a sequence of programmed instructions operable to configure a computing platform to perform the mediation and synchronization functions. The enterprise broker 102 may synchronize data by, for example, database replication or by asynchronous messaging.

Database replication generally involves maintaining a current, trusted copy of the broker client/application 103 data local to or accessible by the enterprise broker 102, access to which is controlled by the enterprise broker 102. Asynchronous messaging may involve the enterprise broker 102 sending a data request message to a broker client/application 103 and receiving current, trusted data in a data response message received from the associated broker client/application 103. The enterprise broker 102 may then provide the received trusted data to another requesting broker client/application 103. The enterprise broker 102 may employ data synchronization mechanisms such as, for example, semaphores to protect against propagation of stale data or corruption of data.

The event monitoring system 100 may, in certain embodiments, include one or more database servers (not shown). In such embodiments, the event monitor 101 and the database server may communicate with each other a network such as, but not limited to, a Local Area Network (LAN) such as an Ethernet.

The event monitor 101 may be implemented, for example, as portions of a suitably programmed general-purpose computer. Alternatively, the event monitor 101 may be implemented, for example, as physically distinct hardware circuits within an Application Specific Integrated Circuit (ASIC). Thus, it should be appreciated that the particular form of the system can be different from that explained herein.

In at least one embodiment, the event monitor 101 may be a standalone computer platform according to the computer system 200 and having its own associated output device. The output device may be a computer display monitor. The event monitor 101 may execute a server portion of software applications associated with the event monitoring system 100 and make available for download and communicate with a client portion of these applications. The event monitor 101 may interact with the event database 106 for responding to commands and requests received from the terminal 105. For example, the event monitor 101 may build or construct interactive pages for output to a requesting user at a terminal 105 using information obtained from the event database 106 as well as derived or other information supplied by one or more applications executing at the event monitor 101. In at least one embodiment, the event monitor 101 may be implemented using a Personal Computer (PC) running Microsoft Windows® NT®. Alternatively, the event monitor 101 may be a Sun workstation™ available from Sun Microsystems of Palo Alto, Calif., or any UNIX™-based platform.

The event database 106 may provide storage for received data events information and properties files as well as information useful for associating data events with a particular broker 102 and originating broker client/application 103. This information may include records containing broker client/application 103 properties.

In at least one embodiment, the information stored in or maintained using the event database 106 may be provided in conformance with a database management system format such as, but not limited to, the Structured Query Language (SQL) format. The event monitoring application 300 described herein may be stored using the event database 106. In at least one embodiment, the event database 106 may be, for example, a SQL database provided by the Oracle® Corporation of Redwood Shores, Calif. The event monitor 101 may comply with the Java Database Connectivity (JDBC) standard and utilize thin type-4 drivers to communicate with the event database 106 to access stored data events. In alternative embodiments, the event database 106 may be implemented in accordance with the DB2 database product standard available from IBM® Corporation. Furthermore, alternatively, the event database 106 may be a SQL Server 7.0 database supporting the ActiveX Data Object (ADO) and Open Database Connectivity (ODBC) protocols provided by IBM® Corporation or Sybase® Corporation. The event database 106 may further include information such as, but not limited to, database query and access instructions in the form of one or more scripts which, when executed by a processor, serve to store and retrieve data maintained using the event database 106 according to the instructions contained in the script, and in particular regarding the data fields to be accessed, as well as their arrangement, provided in the response to the processor.

In at least one embodiment, the event monitor 101 may communicate with the enterprise broker(s) 102 via the network 104. The enterprise broker or brokers 102 may transmit to the event monitor 101 information associated with the occurrence of particular data events for tracking and monitoring. Upon receiving the data event information, the event monitor 101 may log or store the data event information for later processing. In at least one embodiment, the event monitor 101 stores received data event information using the event database 106. Further, the event monitor 101 may maintain a running list of the most recently received data events in local memory for display and retrieval.

In at least one embodiment, the event monitor 101, broker 102, and terminal 105 may be implemented using a computing platform executing a sequence of software instructions.

The terminal 105 may be implemented using a personal computing device having a browser, such as a web browser application. Alternatively, the terminal 105 may be implemented using a wireless terminal such as a personal digital assistant, a cellular or portable telephone terminal, or an Internet appliance, configured for electronic or optical communication with the event monitor 101. An Internet appliance may be, for example, a computer with minimal memory, disk storage and processing power designed to connect to a network, especially the Internet. Although FIG. 1 shows two terminals 105, it is to be understood that the event monitoring system 100 may support any number of such terminals 105, including as few as one terminal 105. The terminals 105 may be collocated with the event monitor 101, or located remotely from the event monitor 101 and coupled to the monitor 101 using the network 104, as shown in FIG. 1.

Figure 2:
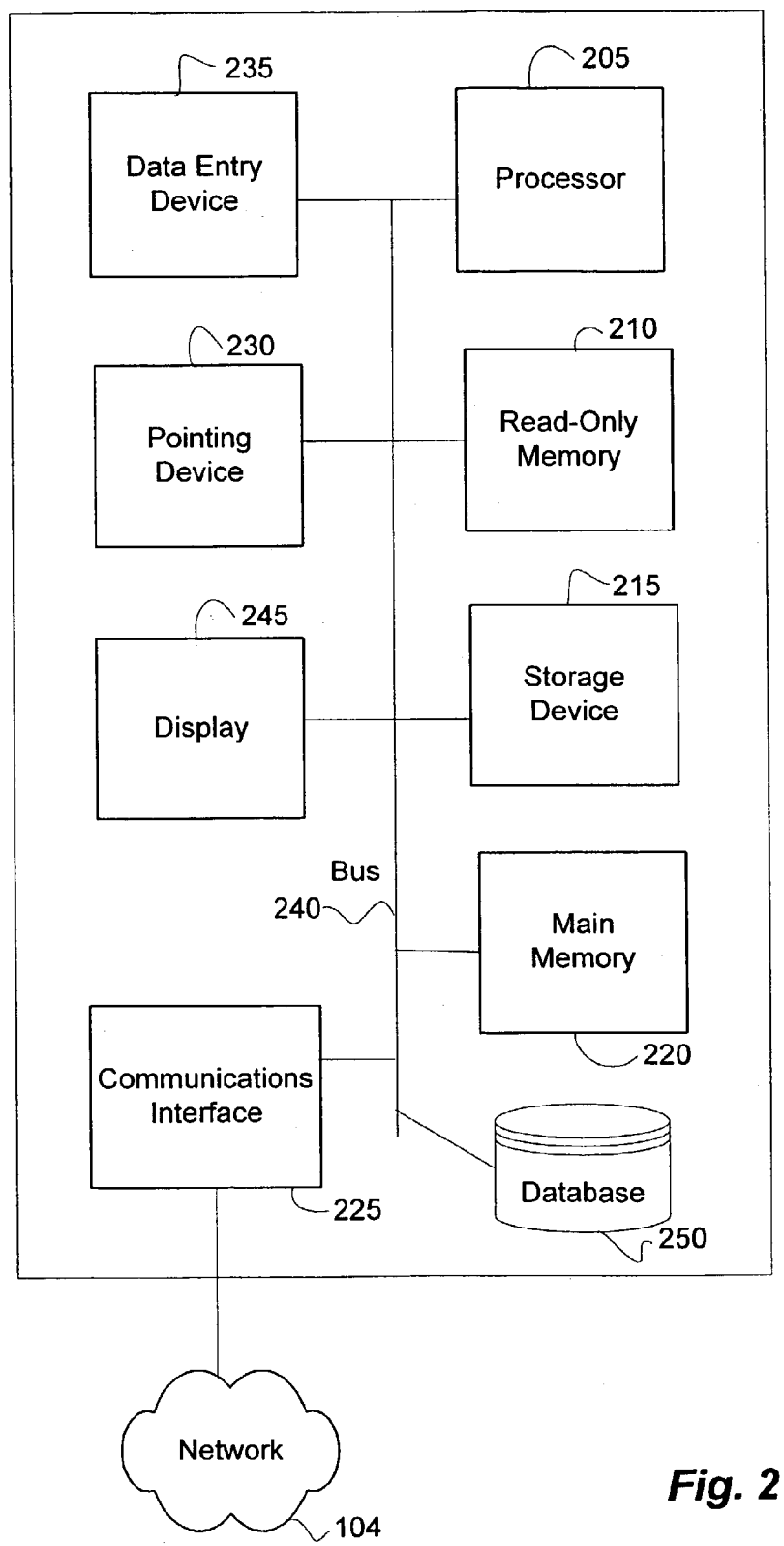
FIG. 2 is a functional block diagram of a computer system which may be used to provide a computing platform for portions of the event monitor in at least one embodiment of the invention.

At least one embodiment of the present invention relates to the use of the computer system 200 for monitoring data events occurring throughout an enterprise served by one or more enterprise brokers 102. FIG. 2 is a block diagram of a computer system 200 that may be used in some embodiments to implement the computing platform for the event monitor 101, broker 102, or terminal 105. The computing system 200 may be implemented as or include one or more personal computers, workstations, handheld personal data assistants, Internet appliances (e.g., a computer with minimal memory, disk storage and processing power designed to connect to a network, especially the Internet, etc.), or controllers. The computer system 200 may include a bus 240 or other communication mechanism for communicating information, and a processor 205 coupled with the bus 240 for processing information. The computer system 200 also may include a main memory 220, such as a Random Access Memory (RAM) or other dynamic storage device, coupled to the bus 240 for storing information and instructions to be executed by the processor 205. The main memory 220 also may be used for storing temporary variable or other intermediate information during execution of instructions to be executed by the processor 205. The computer system 200 further may include a Read-Only Memory (ROM) 210 or other static storage device coupled to the bus 240 for storing static information and instructions for the processor 205. A storage device 215, such as a magnetic disk or optical disk, may be provided and coupled to the bus 240 for storing information and instructions.

The processor 205 may fetch the instructions, decode them, and act or instruct other elements 210-250 to, for example, transfer data to or from the memory 220 or to work in combination with the data entry device 235 or the display 245 (for example, to input or output data), etc. The processor 205 may actually be implemented as more than one processor. It should be appreciated that the processor 205 may be implemented as a general purpose microprocessor, for example, in a central processing unit, a microcontroller, or other similar device.

A database 250 may be coupled to the bus 240 for storing static information and software instructions. Information stored in or maintained using the database 250 may be provided in conformance with a database management system format such as, but not limited to, the SQL format. The database 250 may be a SQL database provided by the Oracle® Corporation of Redwood Shores, Calif. Alternatively, the database 250 may be a SQL Server 7.0 database supporting the ADO and ODBC protocols provided by IBM® Corporation or Sybase® Corporation. The database 250 may include information including, but not limited to, database query and access instructions in the form of one or more scripts which, when executed by a processor such as the processor 205, serve to store and retrieve data maintained using the database 250 according to the instructions contained in the script, and in particular regarding the data fields to be accessed, as well as their arrangement, provided in the response to the processor 205. In at least one embodiment, the event database 106 may be implemented using the database 250.

According to at least one embodiment of the present invention, event monitoring as described herein may be provided by the computer system 200 in response to the processor 205 executing one or more sequences of instructions contained in the main memory 220. Such instructions may be read into the main memory 220 from another computer-readable medium, such as the storage device 215 or the database 250. Execution of the sequences of instructions contained in the main memory 220 may cause the processor 205 to perform the process steps described herein. One or more processors in a multi-processing arrangement may also be employed to execute the sequences of instructions contained in the main memory 220. Alternatively, hard-wired circuitry may be used in place of or in combination with software instructions to implement the invention. Thus, embodiments of the invention are not limited to any specific combination of hardware circuitry and software.

The computer system 200 may be coupled via the bus 240 to a display 245 for outputting information to a computer user. In one embodiment, the display 245 may be a Cathode Ray Tube (CRT) computer display monitor capable of displaying information using multiple colors. Alternatively, the display 245 may be a liquid crystal display, a monochrome monitor, a web-enabled wireless terminal or handheld terminal such as, for example, a Personal Digital Assistant (PDA). The computer system 200 may include other output devices as well such as, but not limited to, a printer.

A data entry device 235, including alphanumeric and other keys, may be coupled to the bus 240 for communicating information and command selections to the processor 205. Another type of user input device which may be coupled to the bus 240 is a pointing device 230, which may be a computer mouse, trackball, cursor direction keypad, tactile directional fingerpad, or other such device for allowing a user to control cursor location and movement on the display 245, and for communicating direction information and command selections to the processor 205. This pointing device 230 typically has two degrees of freedom in two axes, a first axis (e.g., x) and a second axis (e.g., y), that allows the pointing device to specify positions in a plane.

The term "computer-readable medium" as used herein refers to any medium that participates in providing instructions to the processor 205 for execution. Such a medium may take many forms, including, but not limited to, non-volatile media, volatile media, and transmission media. Non-volatile media include, for example, optical or magnetic disks, such as the storage device 215. Volatile media include dynamic memory, such as the main memory 220. Transmission media can also take the form of acoustic or light waves, such as those generated during Radio Frequency (RF) and InfraRed (IR) communications. Common forms of computer-readable media include, for example, floppy disk, a flexible disk, hard disk, magnetic tape, any other magnetic medium, a Compact Disc Read Only Memory (CD ROM), Digital Video Disc (DVD) or any other optical medium, punch cards, paper tape, any other physical medium with patterns of holes, a Random Access Memory (RAM), a Programmable Read Only Memory (PROM), an Erasable Programmable Read Only Memory (EPROM), a Flash EPROM, any other memory chip or cartridge, a carrier wave as described hereinafter, or any other medium from which a computer can read.

Various forms of computer-readable media may be involved in carrying one or more sequences of one or more instructions to the processor 205 for execution. For example, the instructions may initially be borne on a magnetic disk of a remote computer. The remote computer may load the instruction into its dynamic memory and send the instructions over a telephone line using a modem. A modem local to the computer system 200 may receive the data on the telephone line and use an infrared transmitter to convert the data to an infrared signal and place the data on the bus 240. The bus 240 may carry the data to the main memory 220, from which the processor 205 retrieves and executes the instructions. The instructions received by the main memory 220 may optionally be stored on the storage device 215 either before or after execution by the processor 205.

The computer system 200 may also include a communication interface 225 coupled to the bus 240. The communication interface 225 may provide a two-way data communication coupling to the network 104. For example, the communication interface 225 may be a modem or an Integrated Services Digital Network (ISDN) card to provide a data communication connection to a corresponding type of telephone line. As another example, the communication interface 225 may be a LAN card to provide a data communication connection to a compatible LAN. Wireless links may also be implemented. In any such implementation, the communication interface 225 sends and receives electrical, electromagnetic, or optical signals that carry digital data streams representing various types of information.

The communication interface 225 may provide data communication through one or more networks to other data devices. For example, the communication interface 225 may provide a connection through a local network to a host computer or to data equipment operated by an Internet Service Provider (ISP). The ISP may in turn provide data communication services through a worldwide packet data communication network such as the Internet. These networks use electrical, electromagnetic, or optical signals that carry digital data streams. These signals are exemplary forms of carrier waves transporting the information.

The communications interface 225 may include Ethernet interface or a LAN communication card, a dial-up modem interface using the PSTN, an intranet, or any combination thereof.

The computer system 200 may send messages and receive data, including program codes, through the network(s) and the communication interface 225. In the Internet example, a server might transmit a requested code for an application program through the Internet, ISP, and the communication interface 225. One such downloaded application may, for example, provide for event monitoring as described herein. The received code may be executed by the processor 205 as it is received, and/or stored in the storage device 215, or other non-volatile storage for later execution. In this manner, the computer system 200 may obtain an application code in the form of a carrier wave.

The event monitor 101 may receive commands and data from the terminals 105 and output program code and data to the terminals 105 using the network 104. In an embodiment, the event monitor 101 may generate and transmit the requested information to the requesting user via Hypertext Transfer Markup Language (HTML) formatted or eXtensible Markup Language (XML) formatted pages, which may be provided as World Wide Web pages, using the network 104. As described previously, the network 104 may be, for example, a network of interconnected networks such as the Internet, a LAN, a WAN, an intranet including any of these, and/or the PSTN. Interactive pages transmitted and received using the network 104 may conform to the SSL protocol.

The communications interface 225 may further include a web browser or a so-called thin client. A thin client may be a client portion of an application designed to require little memory so that the bulk of the data processing occurs on a corresponding server. In at least one embodiment, a thin client may be Java-based. The web browser displays data and is capable of communicating with other computers via a network such as, for example, the Internet or an intranet. The web browser provides a user with a way to navigate, via, for example, hyperlinks which are selected by the pointing device 230 such as a computer mouse, or as typed in by the user. The web browser uses a protocol such as, for example, HyperText Transfer Protocol (HTTP) or File Transfer Protocol (FTP), to transmit data of various content such as, for example, HTML formatted documents, plain text documents, graphic images, and XML documents for presentation to the user via the display 245. Web pages formatted in accordance with HTML or XML may also be provided in accordance with the eXtensible Style Language (XSL) specification available from the World Wide Web Consortium. XSL is useful for separating style from content as well as for providing a common interface for sharing of web pages across applications. The web browser may also run or execute programs, such as Java applets including sequences of instructions provided in accordance with the Java programming language, or JavaScript. The web browser may be, for example, Internet Explorer® by Microsoft® Corporation, Netscape Navigator® by Netscape®, America Online® browser, or any other web browser. A thin client may utilize a two or more tiered client server model. In this model, the may client run a minimal set of services that provide functionality to interface with at least one server. A web browser may be a thin client. The event monitor 101 may run, for example, the Windows® NT network operating system available from Microsoft® Corporation of Redmond, Wash.

Instructions executed by the processor 205 from the main memory 220 may include, for example, application software instructions that cause the processor 205 to perform operations as described herein. These application instructions may be implemented in the form of source code statements provided in accordance with, for example, the Visual C++® and Visual Basic® higher order programming languages, development kits for which are available from Microsoft® Corporation of Redmond, Wash. Application instructions may also include database scripts for accessing, storing, or selectively retrieving information contained in the database 250 or the event database 106. The database scripts may be contained in the storage device 215 or may be stored using the database 250 or the event database 106. The database scripts may be implemented in the form of programming statements provided in accordance with, for example, SQL version 7.0 database management system query language, as well as the IBM DB2® system. Other database implementations are possible, including those available from Oracle® or Transact SQL in accordance with the ColdFusion® database management system.

Application software instructions may include a user interface portion, which may be a Graphical User Interface (GUI) portion, for generating interactive pages or display screens by which a user may provide data to and receive information from the computer system 200 and the database 250 or the event database 106 using a human-machine interface such as, but not limited to, the display 245. Interactive pages may include user dialog boxes for accepting user entered information. In particular, the GUI portion may prompt the user to enter data by providing an interactive dialog box or message box instructing the user to enter particular data, or to select from among a multitude of options provided using a pull-down menu. The human-machine interface may also include a hardcopy generating device such as a printer. A user may interact with the computer system 200 via the graphical user interface provided by the GUI portion by using the pointing device 230 and the data entry device 235. The GUI portion may place the output of the computer system 200 in a format for presentation to a user via the display 245. In at least one embodiment, the GUI may be implemented as a sequence of Java Swing® instructions. Java Swing® is part of the Java™ Foundation Classes (JFC) in the Java™ platform. The JFC encompasses a group of features to aid in the development of GUIs. Swing® provides all the components from buttons to split panes and tables. The Java™ classes and logic of the GUI may be implemented in Java™. The WebMethods® API may also written in Java™.

In particular, a user may select a particular data entry field of an interactive display page presented using the display 245 by using the pointing device 230 or the data entry device 235 to select that field. Upon selecting a field, a user may then enter information into the data entry field using the data entry device 235. After the user has entered data into the data entry field, the user may cause the GUI portion to input the user-entered information to the computer system 200 using the pointing device 230 to select a corresponding display icon or command button.

Thus, the terminals 105 may send messages and receive data, including program codes, through the network(s) 104 and the communications interface 225. In at least one embodiment, the terminal 105 might transmit a requested code for an application program through the Internet, ISP, and/or the communication interface. In accordance with at least one embodiment, one such downloaded application provides for user interaction with the event monitoring system 100 using the interactive displays or interactive pages described herein. The received code may be executed by the processor 205 as it is received, and/or stored in a non-volatile storage device for later execution. In this manner, computer system 200 may obtain an application code in the form of a carrier wave.

The event monitor 101 may receive commands and data from the terminals 105 and output program code and data to the terminals 105 using the network 104. In at least one embodiment, the event monitor 101 may generate and transmit the requested data to the requesting user via HTML formatted or XML formatted pages, which may be provided as World Wide Web pages, using the network 104. The network 104 may be, for example, a network of interconnected networks such as the Internet, a LAN, a WAN, an intranet including any of these, and/or a PSTN. The communications interface 225 may further include a web browser or thin client. A thin client is a client portion of an application designed to require little memory so that the bulk of the data processing occurs on a corresponding server. In at least one embodiment, a thin client may be Java-based. The web browser may be configured to display data and communicate with other computers via a network such as, for example, the Internet or an intranet. The web browser may provide a user with a way to navigate, via, for example, hyperlinks which may be selected by the pointing device (such as a computer mouse), or as typed in by the user. The web browser uses a protocol such as, for example, HyperText Transfer Protocol (HTTP) or File Transfer Protocol (FTP), to transmit data of various content such as, for example, HTML formatted documents, plain text documents, graphic images, and XML documents for output presentation to the user via the display.

The event monitor 101 may include a sequence of programmed instructions, which, upon execution, are operable to configure the computer system 200 to carry out the event monitoring and simulation capabilities described herein. These software instructions may be implemented using, for example, Javascript® instructions. Other implementations are possible. For example, the valuation portion 301 may be implemented using programmed instructions in accordance with the C++, Visual Basic™, or Javascript® programming languages, or any combination thereof. The event monitor 101 may thereby be configured, using a sequence of programming instructions, for example, to monitor data events that flow through the broker(s) 102. The event monitor 101 may be further configured to provide event flow simulations to test the performance of the broker 102 data flow topologies according to specified technical parameters. In at least one embodiment, an event monitoring application 300 may include all or a portion of the event monitor 101 programmed instructions as shown in the functional block diagram of FIG. 3.

Figure 3:
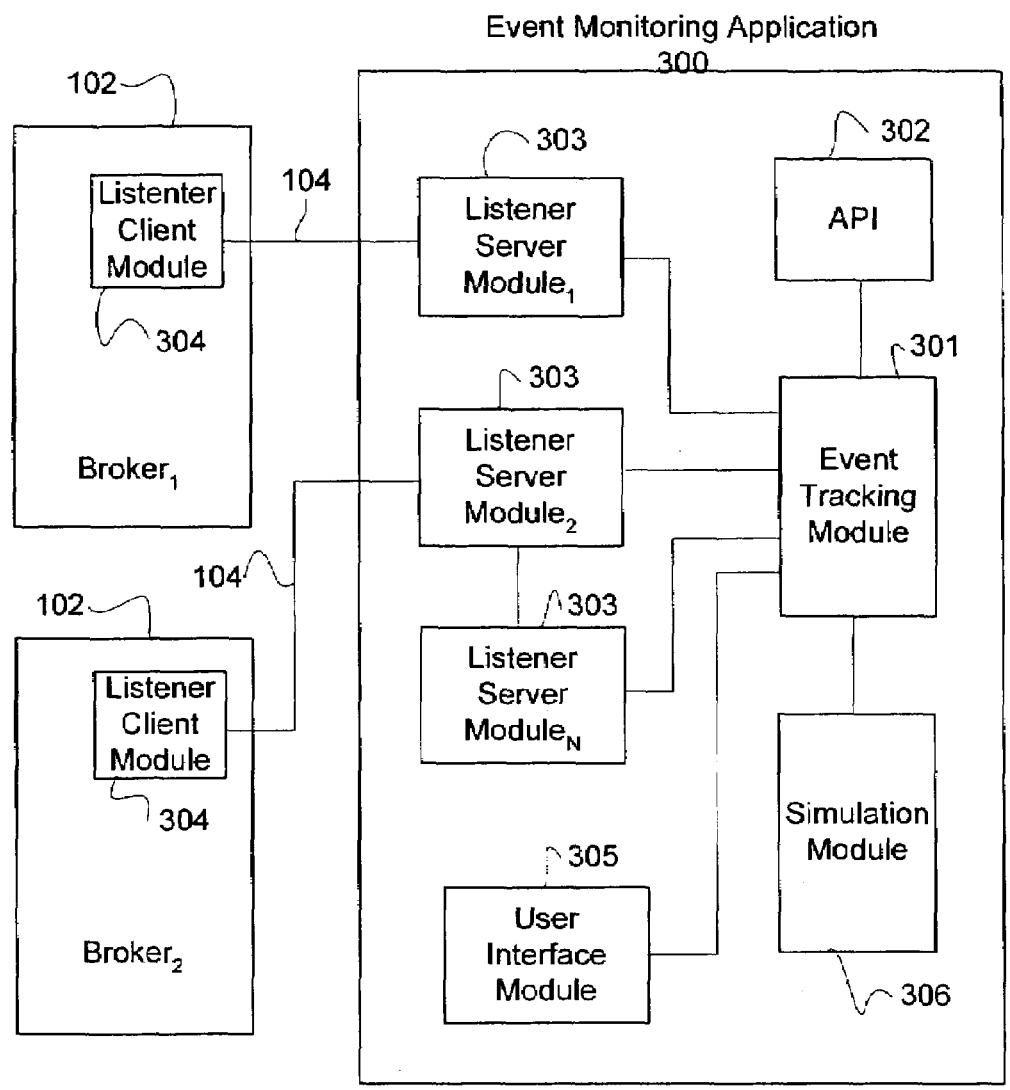
FIG. 3 is a functional block diagram of an event monitoring application for at least one embodiment of the invention.

Referring to FIG. 3, the event monitoring application 300 may include an event tracking module 301, an API 302, one or more paired listener server modules 303 and listener client modules 304, a user interface module 305, and a simulation module 306. Multiple listener modules 303 and 304 may be implemented across one or more brokers 102. The event tracking module 301, user interface module 305, and simulation module 306 may use the WebMethods® Version 4.0.2 JAVA API and may be developed using the Java® Development Kit (JDK) version 1.2 or higher available from Sun Microsystems. At least one embodiment may use the WebMethods® supplied make files and directory structure. The event tracking module 301, user interface module 305, and simulation module 306 may also include sequences of database access scripts to effect storage and retrieval of event data using the event database 106. These database access scripts may be implemented in the form of SQL scripts.

Figure 4:
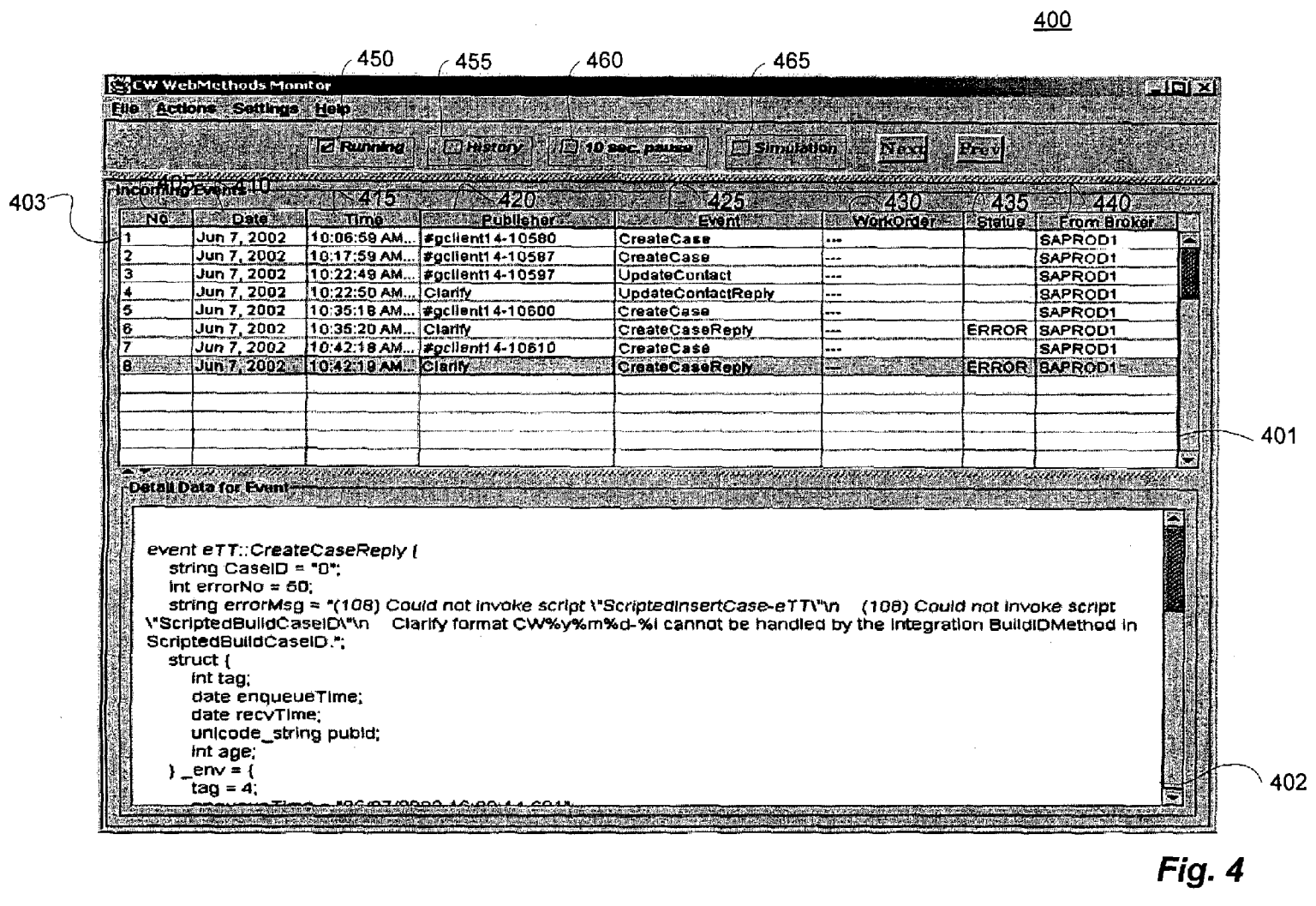

The event tracking module 301 may include a sequence of programmed instructions configuring the event monitor 101 to perform real-time and historical event viewing to support development of business process integrations within an enterprise, including, but not limited to, WebMethods® integrations. The event tracking module 301 may also include instructions to implement performance metrics to provide visibility into the effectiveness of various integration topologies. Data event information for data events of interest may be received by the event tracking module 301 from the listener module 303. The event tracking module 301 may store the received data event information in the event database 106. The event tracking module 301 may maintain a running list of the most recently received data events. This running list of events may be displayed as shown in FIG. 4 using, for example, the display 245. In at least one embodiment, updating information for the running list of events may be output to the terminal 105 using the network 104.

The API 302 may provide a set of predefined function parameters and communication standards to facilitate use of the event monitor 101 and integration with other software applications.

The paired listener server modules 303 and 304 may be programmed to observe data events of interest and report them to the event tracking module 301 via the network 104. In order to receive data events information from a broker 102, the event monitor 101 may establish a connection to the broker 102 using the network 104. In at least one embodiment, a connection may be established for each broker 102 for which data events are to be monitored. A connection may be established as a TCP/IP session between the broker 102 and the event monitor 101, for example. Multiple brokers 102 may be supported by supplying connect information for each broker 102 in a properties file. The broker connect properties file may be stored using the event database 106. In at least one embodiment, a listener server module 303 may be provided at the event monitor 101 for each such connection to a broker 102. Each listener server module 303 may be associated with a corresponding listener client module 304 resident at the broker 102. The listener client module 304 may be configured to output to the event monitor 101 data event information associated with particular data events flowing through the broker 102. In at least one embodiment, listener client modules 304 are configured by the user entering broker-formatted instructions at the broker 102.

The user interface module 305 may include a sequence of programmed instructions for receiving user requests and input and for generating interactive output pages. The user interface module 305 may include a GUI portion. The GUI portion may generate interactive pages or display screens by which a user may provide data to and receive data from the computer system 200 using a human-machine interface such as, but not limited to, a display. Interactive pages may include user dialog boxes for accepting user entered data. The human-machine interface may also include a hardcopy generating device such as a printer. A user may interact with the computer system 200 via the graphical user interface provided by the GUI portion by using the pointing device and the data entry device. The GUI portion may place the output of the computer system 200 in a format for presentation to a user via the display. In at least one embodiment, user input may be received by the user interface module 305 of the event monitoring application 300 as data entered into a data entry field of an interactive page, such as, but not limited to, a browser page or a world wide web page. User input from the pages may provide data event or application information to the event monitoring system 100 to allow a user to specify which data events should be monitored and/or reported by the event monitor 101. The user interface module 305 may output Windows® formatted display pages or interactive pages such as, for example, browser formatted pages or world wide web pages. The output interactive pages may provide to the user a list of the data events matching a set of parameters or the results of an event simulation.

FIG. 4 is an example of a data events output display provided by at least one embodiment. Referring to FIG. 4, data event information may be output by the user interface module 305 in the form of a browser formatted monitor page 400. The monitor page 400 may be output to the user using, for example, the display 245. Monitor display window 400 may include an incoming events list 401 and detailed event data 402. The incoming events list 401 may include a running list of the most recent data events 403 received by the event monitor 101. The number of recent data events 403 displayed in the incoming events list 401 may be adjusted by the user enlarging or reducing the incoming events list 401 viewing field using, for example, the pointing device 230 to drag a pane of the viewing field to a desired location. The incoming events list 401 may include for each data event 403 a number of descriptive fields including, but not limited to, an event number 405, an event time 410, an event date 415, the publisher 420 of the data event 403, an event description 425, a work order 430, an event status 435, and a broker identifier 440.

The event number 405 may be a numeral reflecting a position of a particular data event 403 in the incoming events list 401. The data events 403 in the incoming events list 401 may be ordered for presentation according to a variety of criteria. In at least one embodiment, data events 403 in the incoming events list 401 may be provided in chronological order as shown in FIG. 4.

The event time 410 and event date 415 may provide an event timestamp providing an indication of the date and time at which a data event 403 occurred as reported by the originating broker client/application 103. The publisher 420 may provide an indication of the broker 102 or broker adapter, or a related process, that published a particular data event 403. In at least one embodiment, the event monitor 101 may use or conform to WebMethods® event publishing protocols. Further details regarding the WebMethods® publishing model are available from industry sources such as, for example, the ActiveWorks Reference: Java Platform—Volume I, Version 4.02, Part No. 100-00009-0402, manual published by Active Software, Inc. of Santa Clara, Calif. The event description 425 may be a shorthand nomenclature for a data event 403 from which the data event 403 type may be readily apparent to the reader. The work order 430 may be an alphanumeric indicator that identifies a particular event monitoring request established for a listener client 304. In addition, the incoming events list 401 may also include for each data event 403 an account number (not shown). The account number may be used to correlate multiple data events 403 to a single business transaction, for example. The event status 435 may be an alphanumeric indication provided for certain classes of data events 403. For example, a data event 403 reporting an errored transaction may be indicated as an "ERROR" in the event status 435 to assist in commencing corrective action. The broker identifier 440 may provide an indication of the broker 102 from which the data event 403 was received.

Upon user selection of an individual data event 403 in the incoming events list 401 using, for example, the pointing device 230, the event monitor 101 may output the detailed event data 402 for the selected data event 403 via the monitor page 400, as shown in FIG. 4.

Thus, the event monitoring system 100 may provide enterprise personnel such as, for example, operational support teams an easy-to-use tool for monitoring data events that flow through an integrated application/system. Furthermore, by requesting the event monitor 101 to output to the incoming events list 401 the data events 403 associated with a particular work order 430, a user may quickly identify related data events 403 to facilitate troubleshooting activities, for example.

The event monitoring system 100 may provide multiple modes of data event monitoring operations. In at least one embodiment, the event monitoring system 100 may provide the capability for a user to view data event 403 information according to a variety of views as shown on FIG. 4. Referring again to FIG. 4, the event monitoring system 100 may output data event 403 information in running or real-time, history, periodic refresh rate, or simulation modes of operation. In at least one embodiment, a user may request the event monitoring system 100 to output data event 403 information in one of these modes by selecting the "Running" checkbox 450, the "History" checkbox 455, the "10 Sec. Pause" checkbox 460, or the "Simulation" checkbox 465 using, for example, the pointing device 230. a historical record of certain selected data events 403. User selection of the "Running" checkbox 450 may cause the event monitor 101 to output a running list of data events 403 with new data events 403 being added to the incoming events list 401 as they are received, in order to provide for real-time event monitoring as described above with respect to FIG. 4.

User selection of the "10 Sec. Pause" checkbox 460 may cause the event monitor 101 to update and output a revised incoming events list 401 that includes data events 403 received since the last update. In at least one embodiment, the event monitor 101 may periodically update the incoming events list 401 at a periodic frequency of once every ten seconds. Alternatively, the periodic update frequency may range from once per second to once per hour, for example. Furthermore, in an alternative embodiment, the update frequency may be user-selectable.

Figure 6:
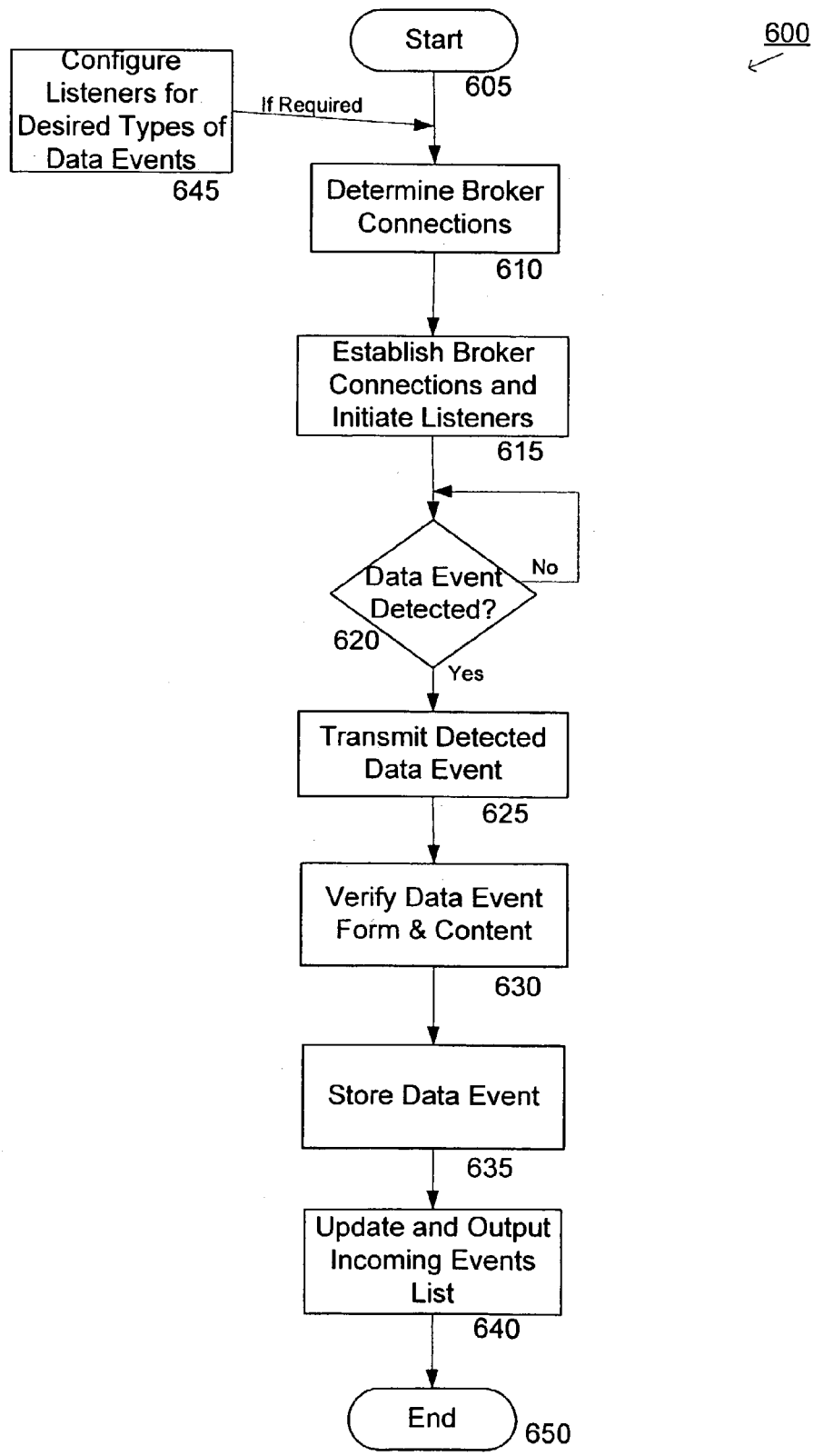
FIG. 6 is a flow chart illustrating an event monitoring method according to at least one embodiment of the invention.

In the running/real-time or periodic refresh rate modes of operation, the event monitoring system 100 may perform event monitoring as shown in FIG. 6, for example. Referring to FIG. 6, an event monitoring method 600 may commence at 605. Control may then proceed to 610 at which the event monitor 101 may read a property file which describes one or more brokers 102 to which the event monitor 101 is to be connected. In at least one embodiment, this may be accomplished by the event tracking module 301 obtaining the broker connections property file from the event database 106.

Upon successfully retrieving and reading the broker connections property file, control may proceed to 615 at which connections may be made to each broker 102 and a listener server module 303 is started on each connection waiting for data events 403 to be received. In at least one embodiment, the type of data events 403 received may be controlled using, for example, the Event Type Editor application and Client Groups parameters specified by the listener client module 304 using features and programs of the enterprise broker 102, at 645. In such embodiments, the Event Type Editor application and Client Groups parameters may be provided by the WebMethods® enterprise broker. The user may define a set of data events 403 for monitoring by the listener client module 304 by subscribing to those events by, for example, including them in the listener client module 304 monitor application group. The group may then be loaded within the Event Type Editor by the user in order to configure the listener client module to monitor for the subscribed to data events 403.

In at least one embodiment, the listener client module 304 monitor application group may be defined using a broker connection property file associated with the Event Type Editor. The user may define the monitor application group by editing, adding, or deleting the information contained in the property field. The following sequence of programmed Javascript® instructions provide an example of an embodiment of a broker connection property file that includes connections for two brokers 102:

```

# Broker connection information

1_brokerHost = 19tip4test
1_brokerName = dgreen
1_brokerClientGroup = EventMonitor
1_brokerClientName = EventMonitor
1_eventScope = EventMonitor
2_brokerHost = IWEDell1
2_brokerName = ClarifyDev
2_brokerClientGroup = EventMonitor
2_brokerClientName = EventMonitor
2_eventScope = EventMonitor

# Maximum size of logfile, no upper limit. logPath for creating logfile.

maxLogSize = -1

# Storage location for received events

storagePath = d:\\ActiveMonitor\\history

# Storage location for help file

helpPath = d:\\ActiveMonitor\\help

# Level of debug for printing messages

debugLevel = 1

# Number of threads handling the database connections

```

-continued

```
dbConnectionPool = 1

# database connect information

dbHost = bitdt2
dbPort = 1527
dbInstance = IDTWRK
dbUserid = ops$idtdev
dbPassword = idtdev
```

Control may then proceed to 620, at which a data event of interest may be detected at a broker 102 by a listener client module 304. Upon receiving such a data event, the listener client module 304 may strip off or extract the application-level header information for the data event. Control may then proceed to 625, at which the listener client module 304 may transmit via the network 104 the data event 403 information to the listener server module 303 corresponding to the listener client module 304 for the broker 102 through which the data event flowed.

Control may then proceed to 630, at which the listener server module 303 may inspect the received data event 403 information for proper content and form. This may be accomplished by, for example, performing content range checking, exceptions checking, and format checking in comparison to valid ranges and formats maintained using the event database 106. If the data event 403 is acceptable, the listener server module 303 may provide the data event 203 to the event tracking module 301.

Control may then proceed to 635, at which the event tracking module 301 may log the data event 403 and store it in the event database 106 by, for example, selecting and formatting a sequence of instructions operable to cause the event database 106 to store the data event 403 as described herein. The event tracking module 301 may provide the data event 403 to the user interface module 305 along with an indication of a new data event 403 for output. The event monitor 101 may maintain a copy of the data event 104 in local memory 215 or 220, or database 250. In at least one embodiment, all data events 403 recorded during a monitor session may be stored using the event database 106 for later retrieval and/or viewing.

Control may then proceed to 640, at which the user interface module 305 may generate an updated monitor page 400 including the new data event 403 in an updated incoming events list 401. In at least one embodiment, the user interface module 305 may render the updated monitor page 400 using a GUI table using page formatting instructions and data obtained from the event database 106 along with the current and new data events 403 being maintained by the event monitor 101. Error events may be noted and the GUI table portion corresponding to the event status field for the applicable data event 403 modified to reflect an 'ERROR' indication. Information maintained in the GUI table may included, but is not limited to, the data event 403 fields 405 through 440 as shown in FIG. 4. The event monitor 101 thereby allows data events to be accurately followed as they flow through the enterprise. The user interface module 305 may output the updated monitor page 400 to the user using, for example, the display 245. If the user desires to view the details of a data event 403, the data event (e.g., the header record) may be selected (e.g., double-click the pointing device 230) and the contents of the data event 403 will be output by the user interface module 305 in response.

Control may then proceed to 650, at which a method 600 may end.

Figure 5:
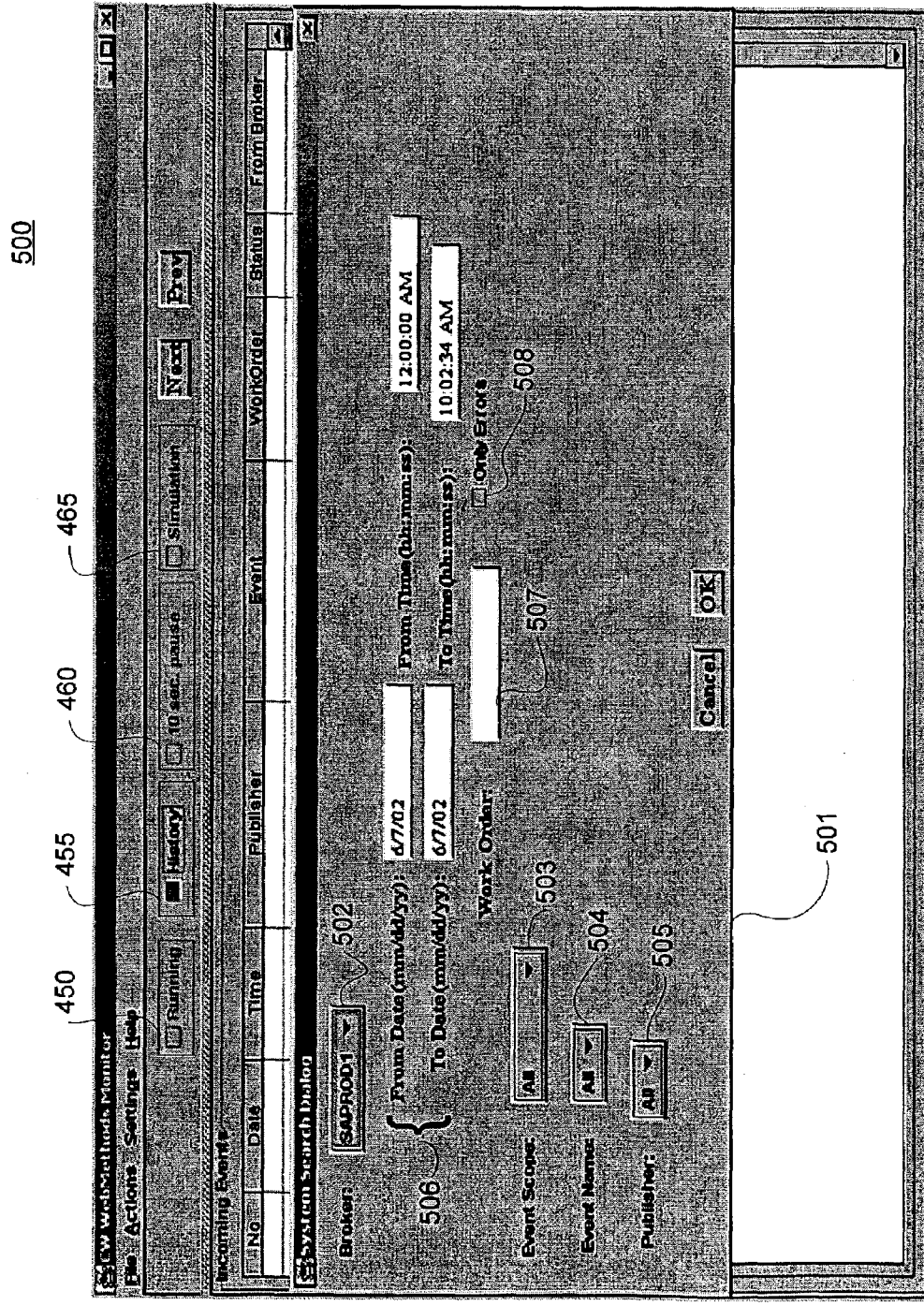
FIG. 5 is an example of a historical events selection page in accordance with embodiments of the invention.

User selection of the "History" checkbox 455 may cause the event monitor 101 to output the chronological history of certain data events 403 that match user-provided selection criteria. In at least one embodiment, the event monitor 101 may output a historical events selection page 500 as shown in FIG. 5 in response to user selection of the "History" checkbox 455. The historical events selection page 500 may allow the user to specify data event parameters using, for example, the pointing device 230 and the data entry device 235, for the event monitor 101 to use in generating and outputting a chronological list of data events 403 associated with the user-entered parameters. The user input may be received by the user interface module 305 and provided to the event tracking module 301. The event tracking module 301 may in turn use the input parameters to formulate corresponding queries to retrieve stored data events 403 corresponding to the requested selection criteria. In at least one embodiment, the event tracking module 301 may produce a sequence of SQL statements designed to retrieve the requested stored data events 403 from the event database 106. Upon obtaining the requested stored data events 403 from the event database 106, the event tracking module 301 may provide the thus obtained data events 403 in a historical events list output to the user interface module 305 to output the data events 403 to the user in an incoming events list 401 as shown in FIG. 4.

The event monitor 101 provides data persistence for all received data event 403 information as discussed with respect to FIG. 4. Because of this data persistence at the event monitor 101, a user may select historical events for display based on any combination of the data event 403 fields 405 through 440 as shown in FIG. 4. The historical events selection page 500 may include a search dialog box 501 as shown in FIG. 5. Referring to FIG. 5, the "search dialog" box 501 may include a variety of interactive features by which a user may enter historical event selection parameters such as, but not limited to, drop down menus for broker selection 502, event scope 503, event name 504, event publisher 505, event from/to date and time 506, work order 507, and an "Only Errors" checkbox 508. A user may select or enter information for one or more of these parameters in order to define the scope of the data events 403 output to the user in historical event monitoring mode.

User selection of the Simulation checkbox 465 may cause the event monitor 101 to perform a simulation of data events 403 flowing through one or more brokers 102 of the enterprise in order to, for example, compare alternative broker 102 and broker client/application 103 communication routing topologies, or to fine tune a particular topology. Simulations may illustrate event flow among brokers 102 and broker client/applications 103 for various different topologies. The event monitor 101 may provide performance metrics for at least two types of integration topologies that can be deployed with the enterprise brokers 102. The simulation module 306 may include a sequence of programmed instructions implementing the simulation features described herein. In at least one embodiment, the simulation module 306 may include a sequence of Javascript® instructions implementing simulation features.

Figure 15:
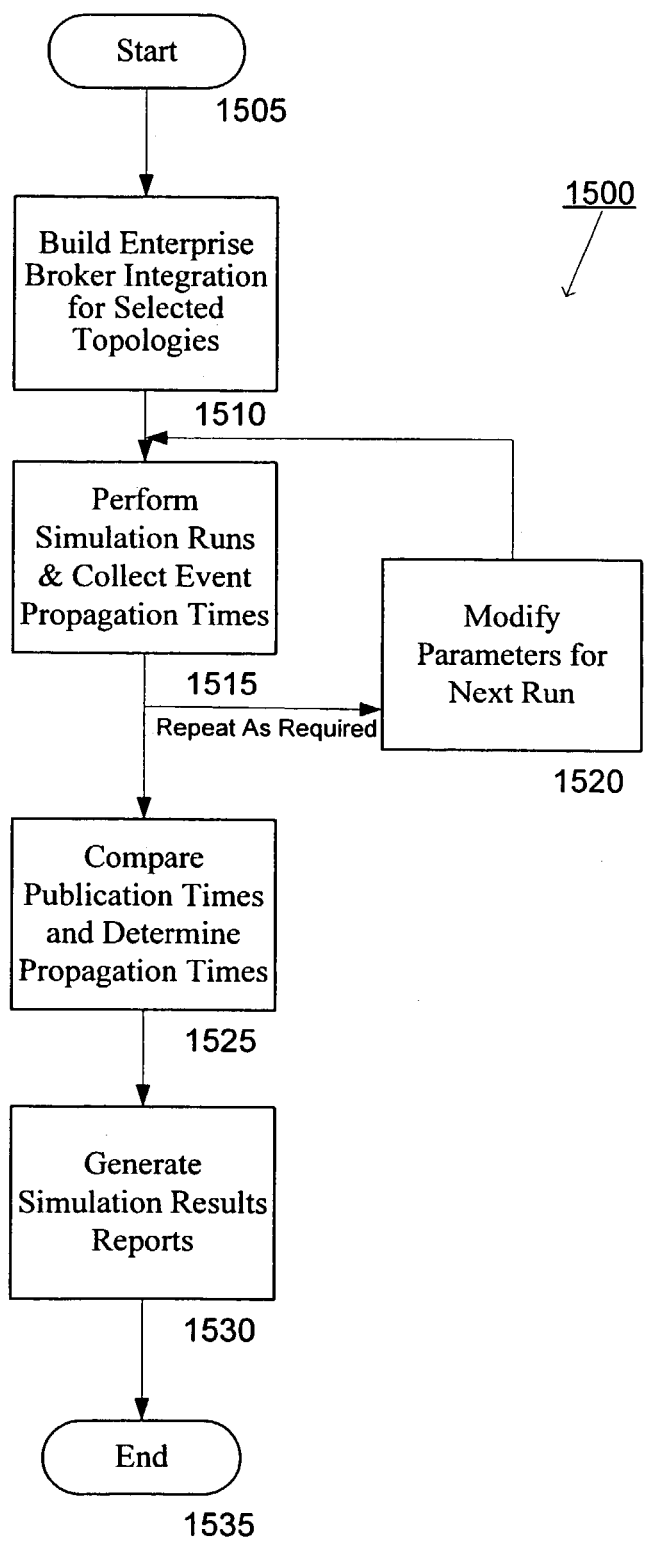
FIG. 15 is a flow chart illustrating a simulation method according to at least one embodiment of the invention.

The simulations can be used, for example, to gauge the performance of an application's architecture. Determining how a broker 102 adapter will behave when performing inter-application messaging within a hub, a circular architecture, mixed (e.g., circular and hub), or other topology may be a useful tool during development or troubleshooting. FIG. 15 is a flow chart of a method 1500 which may be used to conduct a simulation according to embodiments of the invention.

Figure 16:
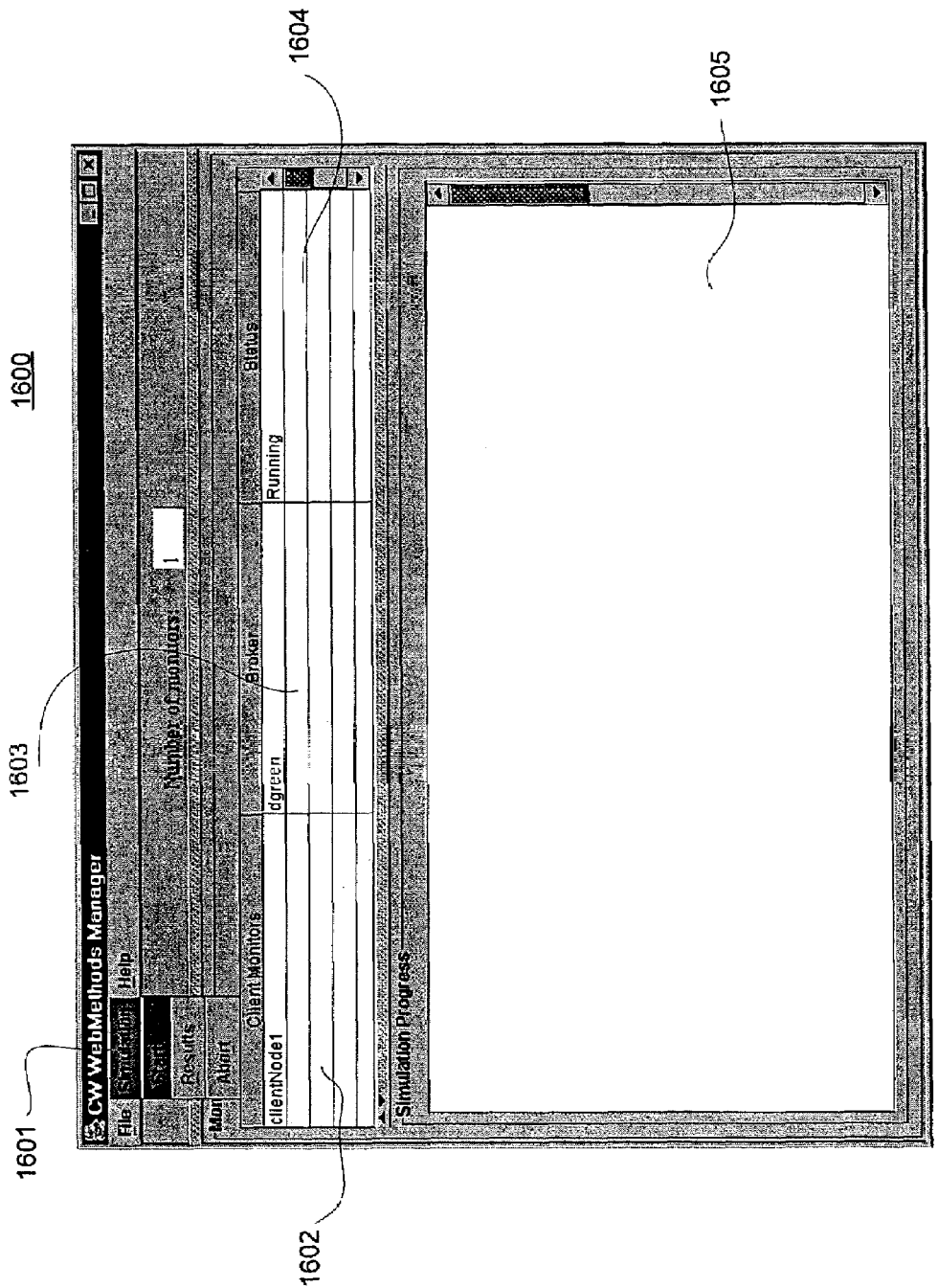
FIG. 16 is an example of a simulation start page provided by at least one embodiment of the invention.

Referring to FIG. 15, a method 1500 for conducting a simulation may commence at 1505. Upon user selection of the Simulation checkbox 465, the user interface module 305 may generate and output an interactive simulation start page. FIG. 16 shows an example simulation start page 1600 provided by at least one embodiment. Referring to FIG. 16, the simulation start page 1600 may include a simulation start selector 1601, a client monitor entry field 1602 for user entry of broker client/applications 103 for simulation, a broker entry field 1603 for user entry of brokers 102 for simulation, a status field 1604 indicating operational status for each client monitor entry in the simulation, and a simulation progress field 1604 for providing a chronological view of data events 403 monitored in the simulation.

In at least one embodiment, the simulation module 306 may request the user to input a simulation name, a simulation message size (for example, in bytes), and the number of message threads to be monitored in the simulation. The user may be prompted to enter this information via, for example, a popup menu associated with the simulation start page 1600 containing data entry fields for entry of the requested information using the data entry device 235.

In addition, as shown in FIG. 16, in at least one embodiment one or more monitors for the simulation may be established by the user. Each such simulation monitor may be configured as described herein independently of other simulation monitors. The ability to include multiple simulation monitors in a simulation may be useful for observing message traffic flow at different points in the simulated system to allow, for example, fine tuning of a messaging topology for improved system performance.

Figure 17:
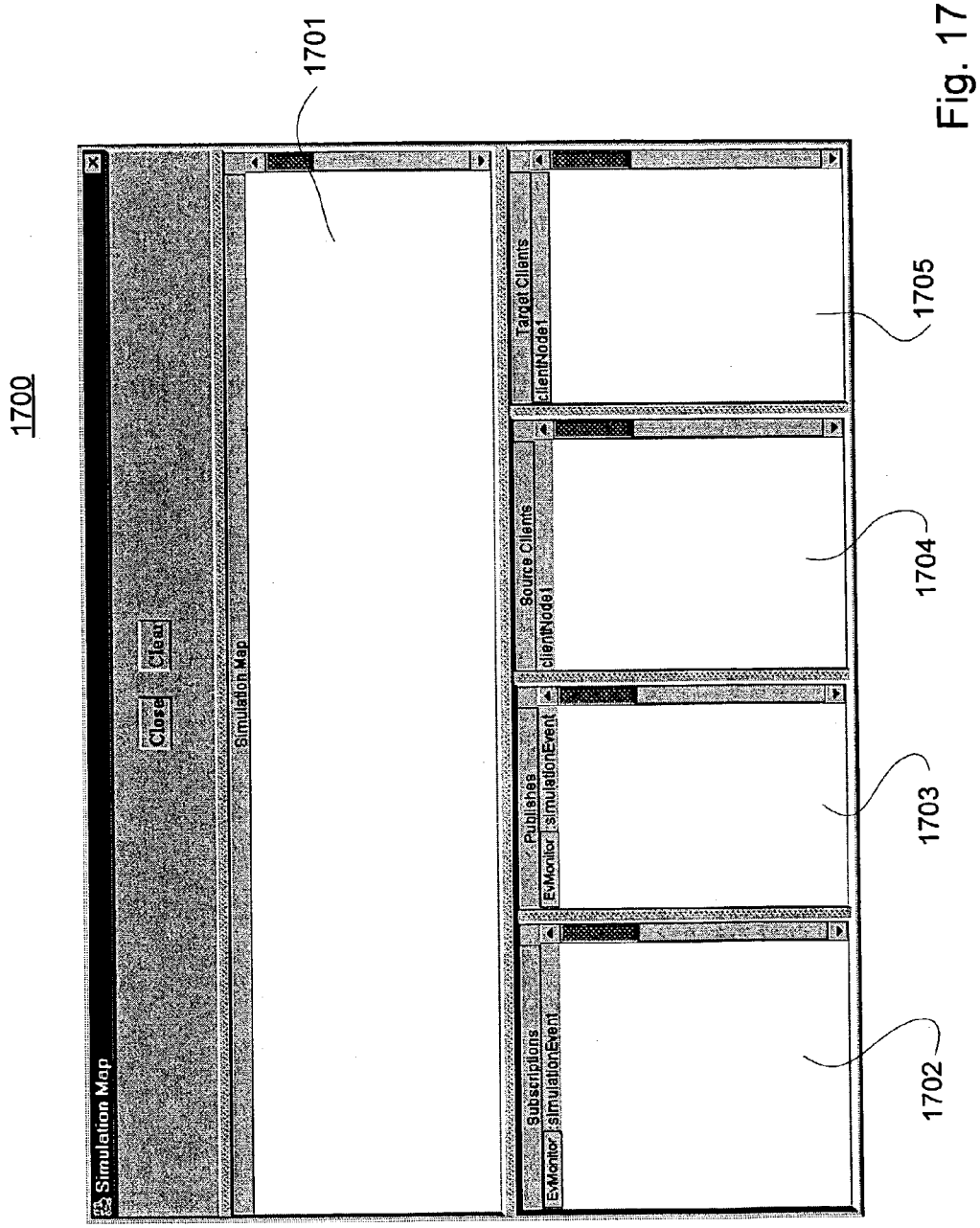
FIG. 17 is an example of a simulation map page provided in an embodiment of the invention.

Returning to FIG. 15, control may then proceed to 1510, at which point the user may build an enterprise broker 102 integration which utilizes an intelligent database adapter such as that provided by Oracle® Corporation of Redwood Shores, Calif. The user interface module 305 and the simulation module 306 may provide interactive pages to facilitate building the integration. The simulation module 306 may allow the broker 102 adapter to support a Select, Delete, Insert, or Update transaction for each received simulated data event in accordance with policy settings supported by the broker 102. Furthermore, the user interface module 305 and the simulation module 306 may provide one or more interactive pages to allow a user to specify the propagation of data events 403 between or among multiple monitors. FIG. 17 illustrates an example simulation map 1700 interactive page which may be provided in an embodiment for this purpose. As can be seen from FIG. 17, interactive fields may be provided for defining an overall simulation map 1701, a list or set of data events 403 subscribed to 1702, a list or set of publishing broker/client applications 1703, source client monitors 1704 for a data event 403, and target or destination client monitors 1705 for a data event 403. The user interface module 305 and the simulation module 306 may also provide a dialog box to prompt the user to request the simulation module 306 to log detail data during the simulation.

Figure 7:
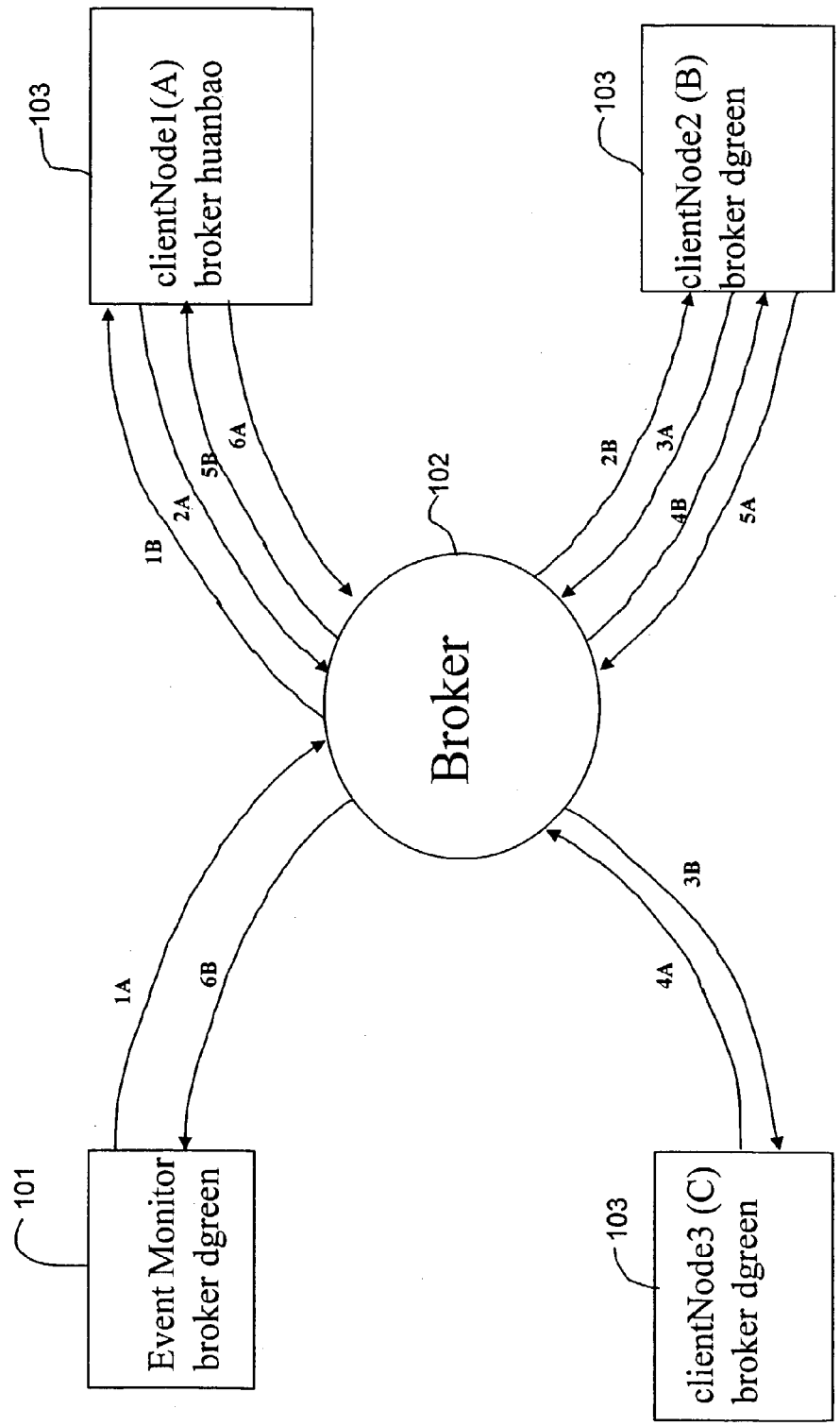
FIG. 7 shows an example of a circular pattern event flow topology simulation in accordance with embodiments of the invention.
Figure 11:
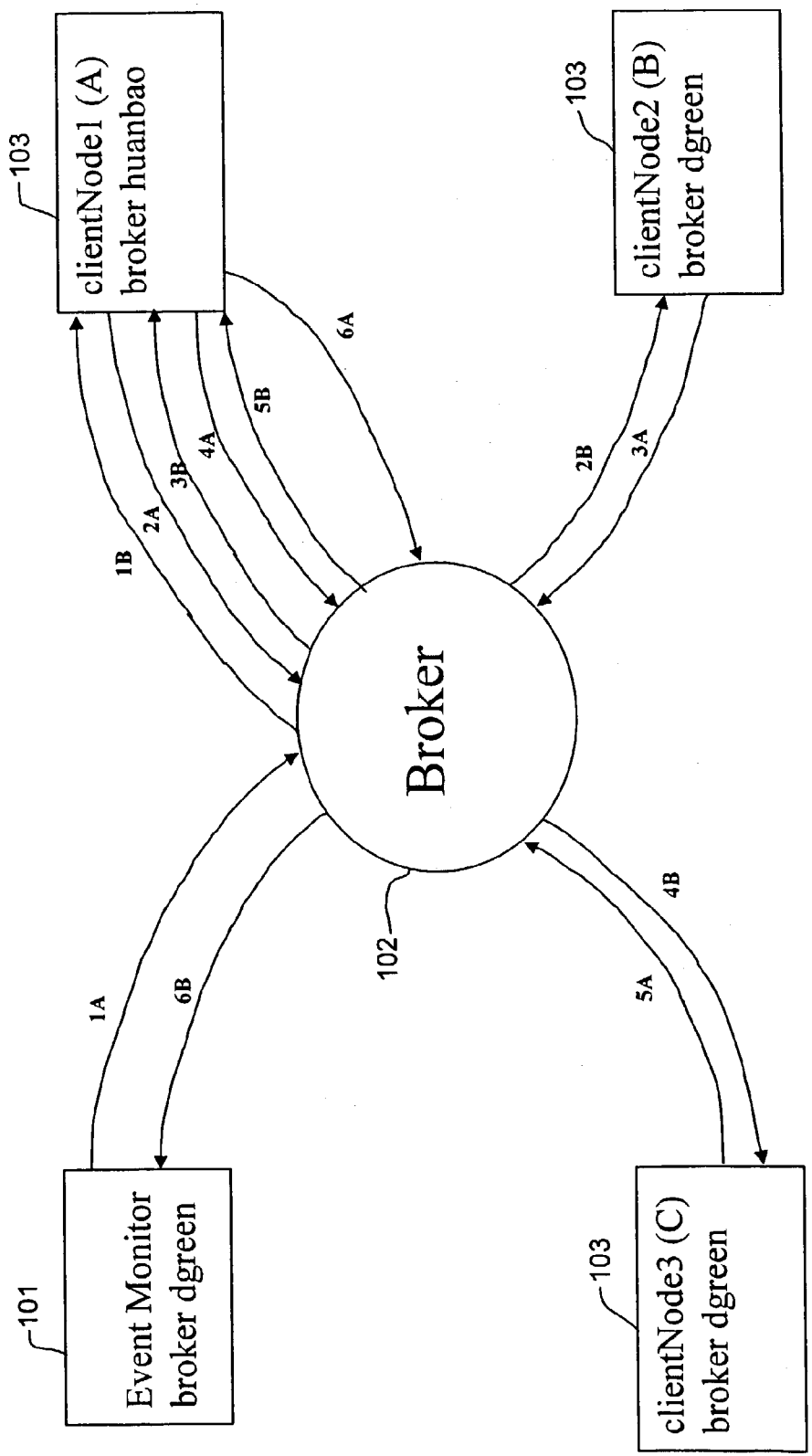
FIG. 11 shows an example of a hub pattern event flow topology simulation in accordance with embodiments of the invention.

Referring to FIG. 15, control may then proceed to 1515 to perform the simulation for one of the topologies of interest built at 1510 (e.g., Hub, Circular, Mixed). The simulation may be performed by the simulation module 306 generating and outputting simulated data events to the next indicated broker 102 or broker client/application 103 as required for the simulated topology and the simulation build of 1510. The simulation module 306 may receive and store the date and time each simulated event is published by a node in the enterprise. In accordance with at least one embodiment, simulations according to various topologies and parameters may be performed. For example, FIG. 7 shows an example of a circular pattern event flow topology simulation. FIG. 11 shows an example of a hub pattern event flow topology simulation. In FIGS. 7 and 11, the directional arrows may indicate simulated event message threads for the referenced simulation runs shown in FIGS. 8 and 12, respectively, and the order of the sequence in which simulated data events 403 occur may be denoted by numbers (e.g., 1, 2, 3) as shown therein. Furthermore, a directional flow labeled as "A" may denote a sending process of a simulated data event 403, while a directional flow labeled as "B" may indicate a receiving process of the simulated data event 403. Under this convention, a data event 403 message "1" may be sent by sender "1A" and received by receiver "1B," for example.

Referring again to FIG. 15, control may proceed to 1520, at which the simulation module 306 modify the number of simultaneous events (e.g., number of threads) for each simulation run. This may be repeated as required for each link or path of interest in the topology being simulated as determined by the simulation build of 1510.

Control may then proceed to 1525, at which the simulation module 306 may compare the publication times of the simulated events when an adapter is being used against times where an adapter is not being used, and determine the differences and simulated event propagation times. The determined differences may be attributable to the broker 102 adapter.

Control may then proceed to 1530, at which the simulation module 306 may generate one or more reports providing the simulation results. FIGS. 8 and 12 show example propagation time reports 800 and 1200 produced by the simulation module 306 indicating the determined propagation times for simulated events for exemplary circular pattern and hub pattern topologies, respectively, as determined by the simulation module 306 at 1525. In FIGS. 8 and 12, the example reports 800 and 1200 are organized into six runs as indicated by the run number 801. Additional information provided by example reports 800 and 1200 may include, but is not limited to, the event publisher 802, the event subscriber 803 or receiver, the broker 804, average event latency times for roundtrip 805, latency for the first leg 806 and last leg 807, event message size 808, and the total threads 809 traversed by the event.

In the reports 800 and 1200 each run may include three lines. The first line of each run may represent the event propagation times between the event monitor 101 and the first monitor client (e.g., clientNode1). This may also represent the entire time of the run. The circular pattern topology of FIG. 7 may require that clients be forwarded data events as they are received. These data events may be forwarded in a chain such as event monitor 101 to clientNode1 to clientNode2 to clientNode3. As these data events are received by each node they may be forwarded until the end of the chain (e.g., clientNode3). When clientNode3 receives a data event, it may return that data event to clientNode2 who returns it to clientNode1 and who returns it to event monitor 101. The receipt of a data event by a node may be the first leg. The return of a data event to the predecessor node may be the last leg. Therefore, in these reports 103, a breakdown of the first and last legs for each node involved in the communication may be provided.

Figure 18:
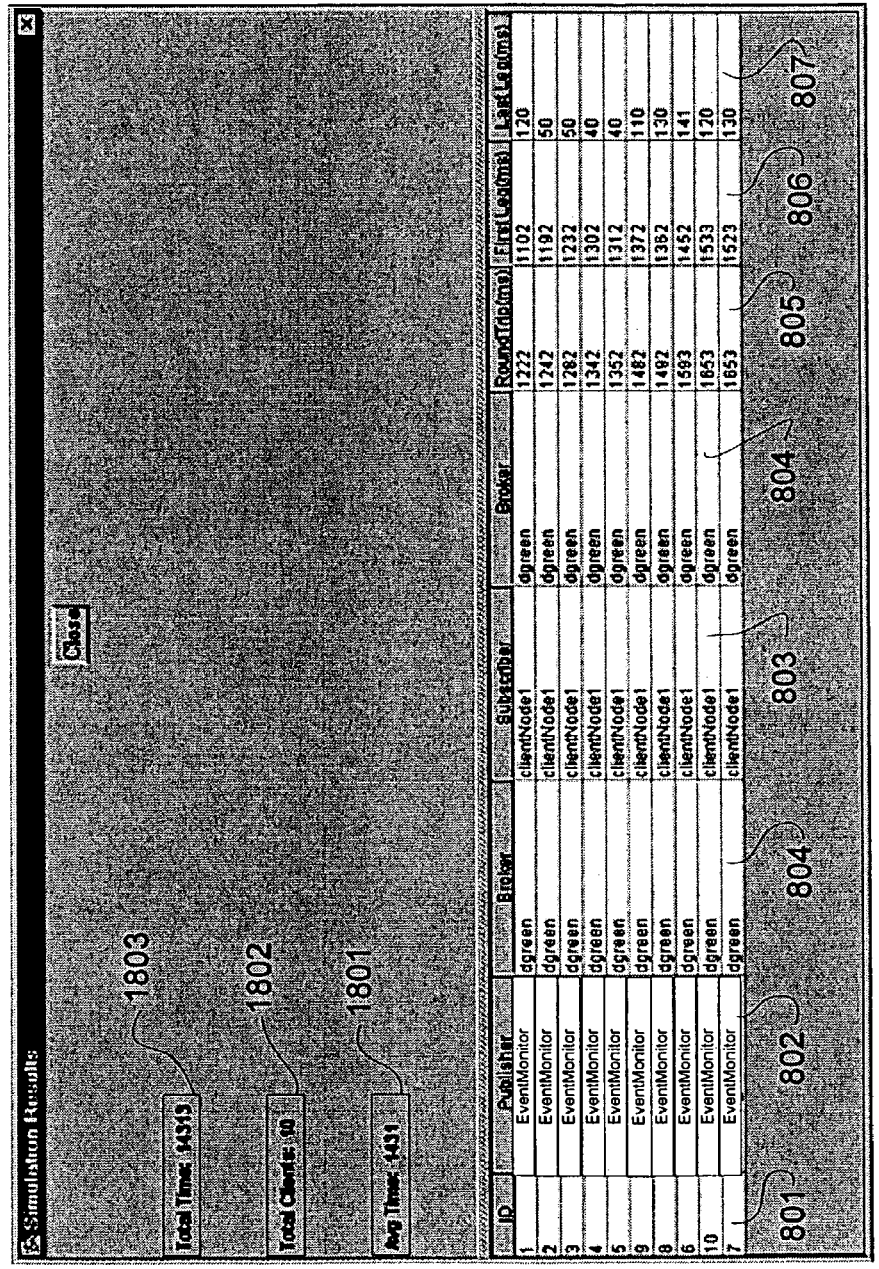
FIG. 18 is an example of a simulation report page provided in an embodiment of the invention.

In at least one embodiment, the event monitor 101 may output the simulation results information of FIGS. 8 and 12 using an interactive page as shown in FIG. 18, for example. FIG. 18 shows an example interactive simulation report page 1800 including the run number 801, the event publisher 802, the associated broker 804 and subscriber 803, roundtrip time 805, and time latency for the first leg 806 and last leg 807.

Furthermore, the interactive simulation report page 1800 may also include a total time indication 1803 showing the total elapsed time for the entire simulation, a number of clients indication 1802 for the simulation, and an average time indication 1801 showing the average time latency for a simulated event in the simulation. The simulation module 306 may calculate these values during or after the simulation using the transmission and receipt message times for simulated events and output the calculated values to the user in one or more reports 103 as described above.

Figure 19:
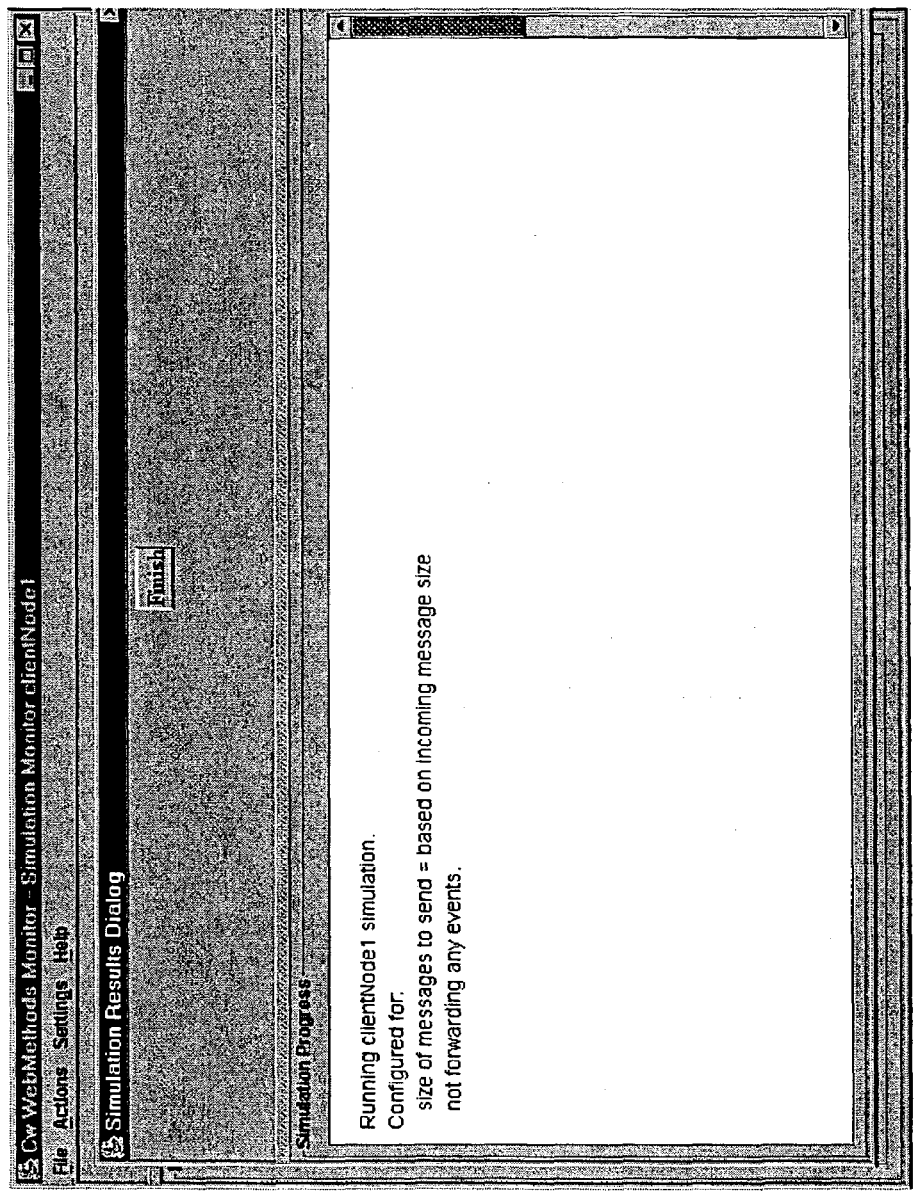
FIG. 19 is an example of a simulation results dialog page provided in an embodiment of the invention.

Furthermore, in at least one embodiment the simulation module 306 and the user interface module 305 may: generate and output an interactive simulation results dialog page to provide ongoing simulation results to the user. FIG. 19 illustrates an example of a simulation results dialog page 1900 that may be provided. As shown in FIG. 19, the simulation results dialog page 1900 may output simulation progress information to the user such as, but not limited to, simulation run status and simulation configuration status.

Figure 20:
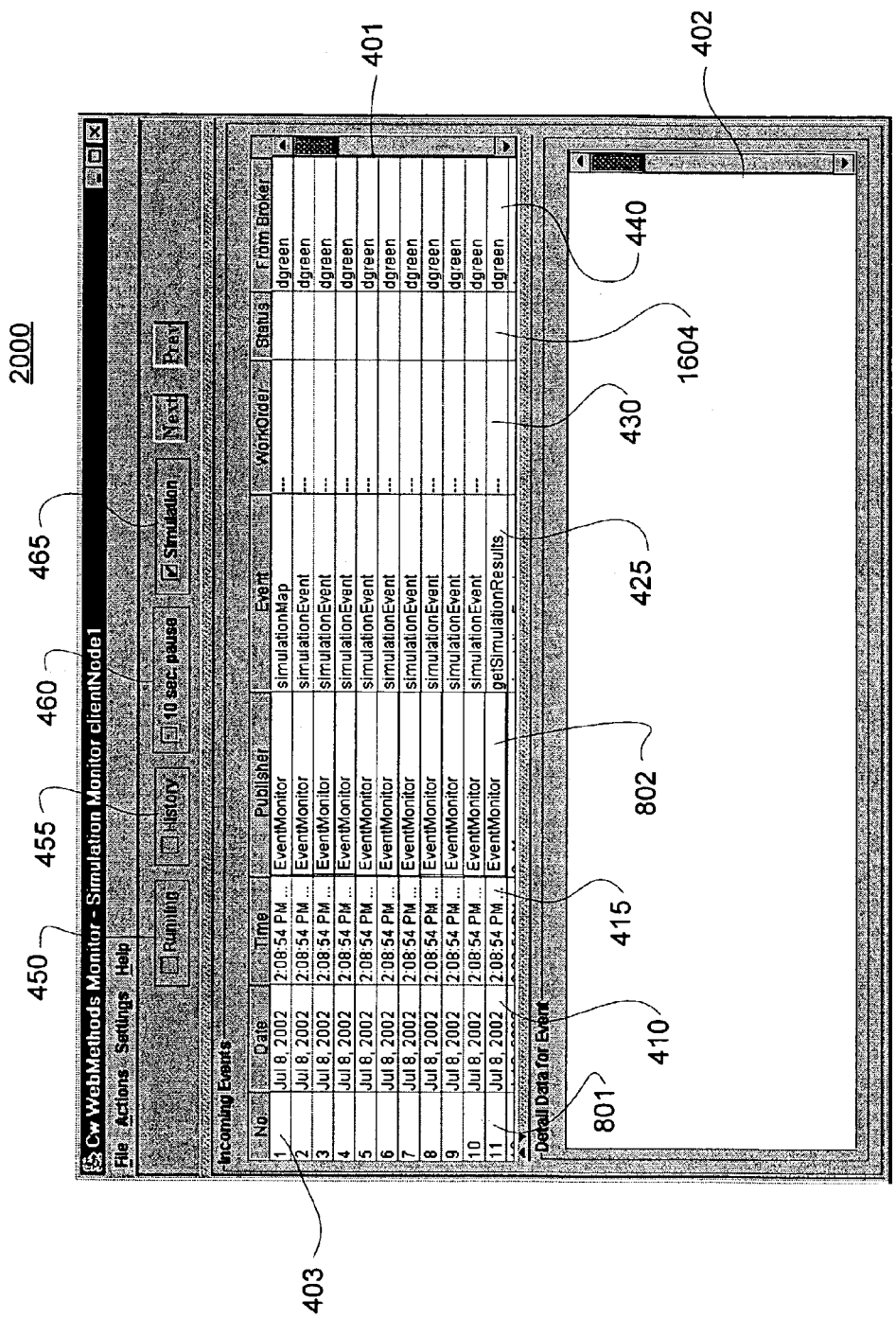
FIG. 20 is an example of a simulation monitor page provided in an embodiment of the invention.

In addition, in at least one embodiment the simulation module 306 and the user interface module 305 may generate and output an interactive simulation monitor page having a format and features similar to monitor page 400. FIG. 20 illustrates an example of a simulation monitor page 2000 that may be provided in an embodiment. As shown in FIG. 20, the simulation monitor page 2000 may output data event information for simulated data events 403 using the incoming events list 401 and detailed event data 402. The incoming events list 401 for the simulation monitor page 2000 may include for each simulated data event 403 a number of descriptive fields including, but not limited to, the event time 410, the event date 415, the event description 425, the work order 430, and the broker identifier 440, as well as the "Running" checkbox 450, the "History" checkbox 455, the "10 Sec. Pause" checkbox 460, or the "Simulation" checkbox 465, as described with respect to FIG. 4. The simulation monitor page 2000 may further include the run number 801 and the event publisher 802 as described with respect to FIG. 8 as well as the operational status field 1604 as described with respect to FIG. 16.

In the hub pattern of FIG. 11, the flow may be different as compared to the circular pattern of FIG. 7. For the hub pattern topology of FIG. 11, the event monitor 101 may send to clientNode1 who sends to clientNode2 and clientNode3. The hub is clientNode1 in this example because clientNode1 may forward all data events to other nodes. The return data events may occur in the same manner as explained above for the circular pattern. The event monitor 101 may start and collect the resulting times for the simulation.

Figure 9:
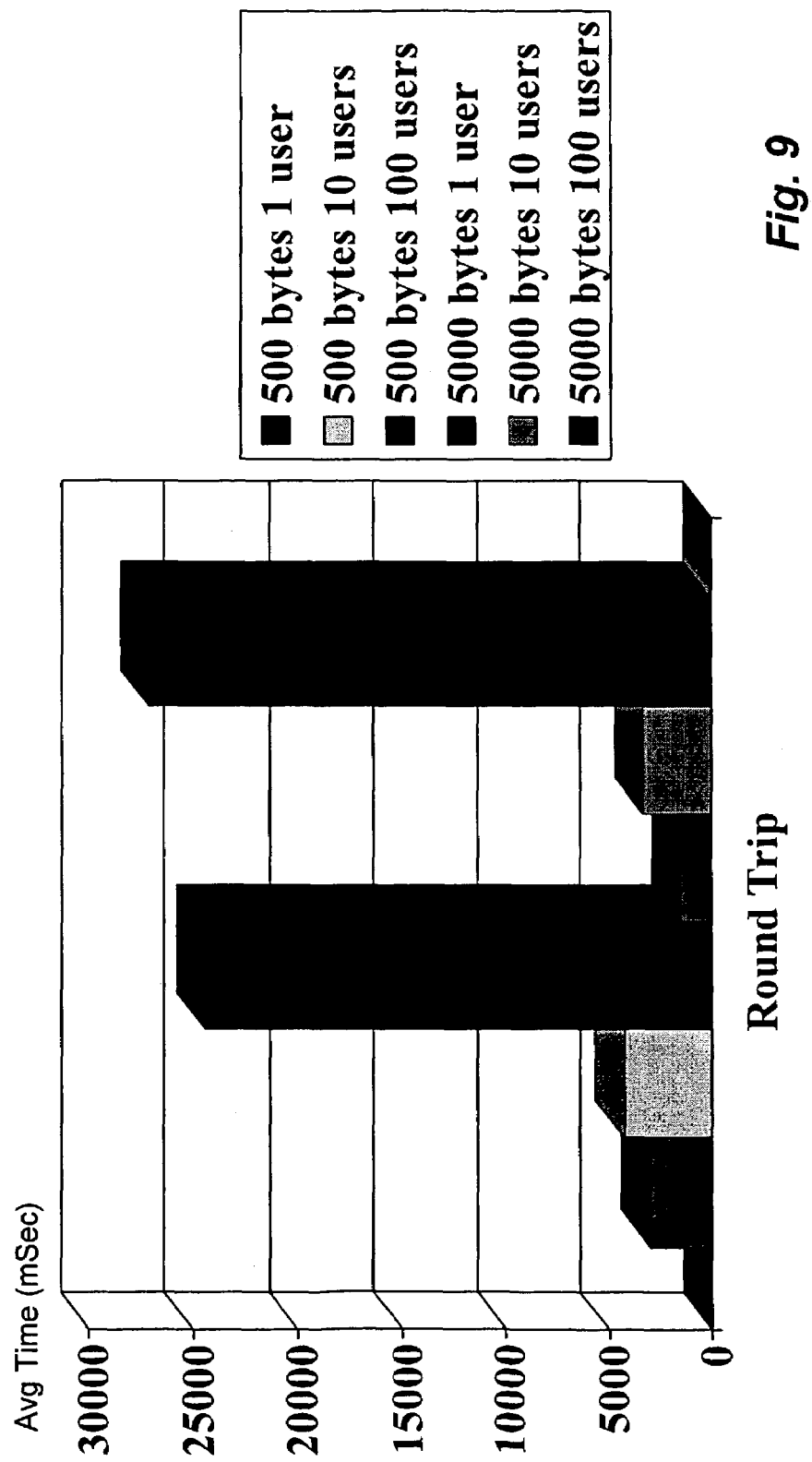
FIG. 9 shows an example of a graphical simulation report showing average round trip propagation times for simulated events according to a circular topology in accordance with embodiments of the invention.
Figure 10:
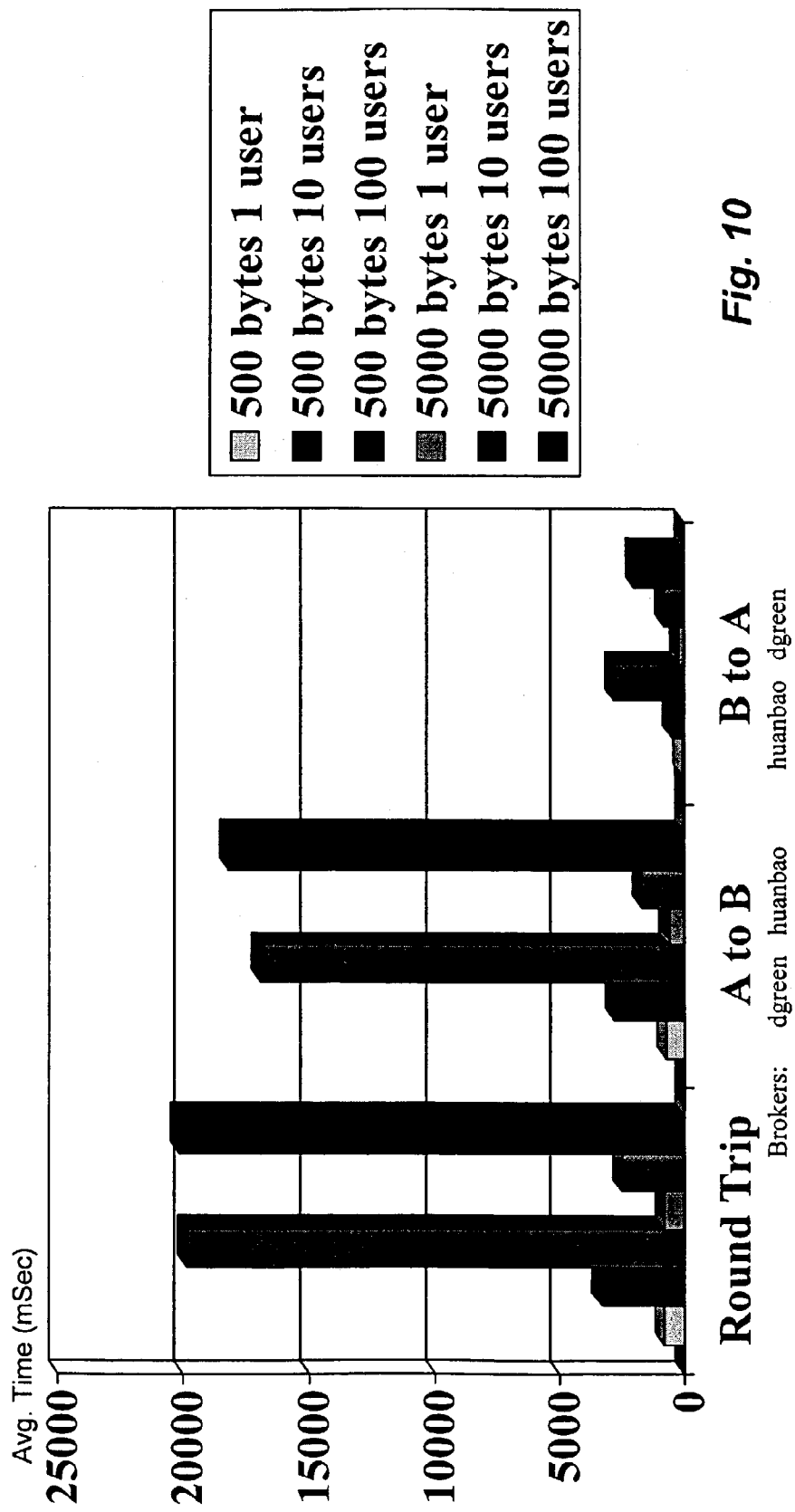
FIG. 10 shows an example of a graphical simulation report showing average propagation times between two enterprise nodes for simulated events according to a circular topology in accordance with embodiments of the invention.
Figure 13:
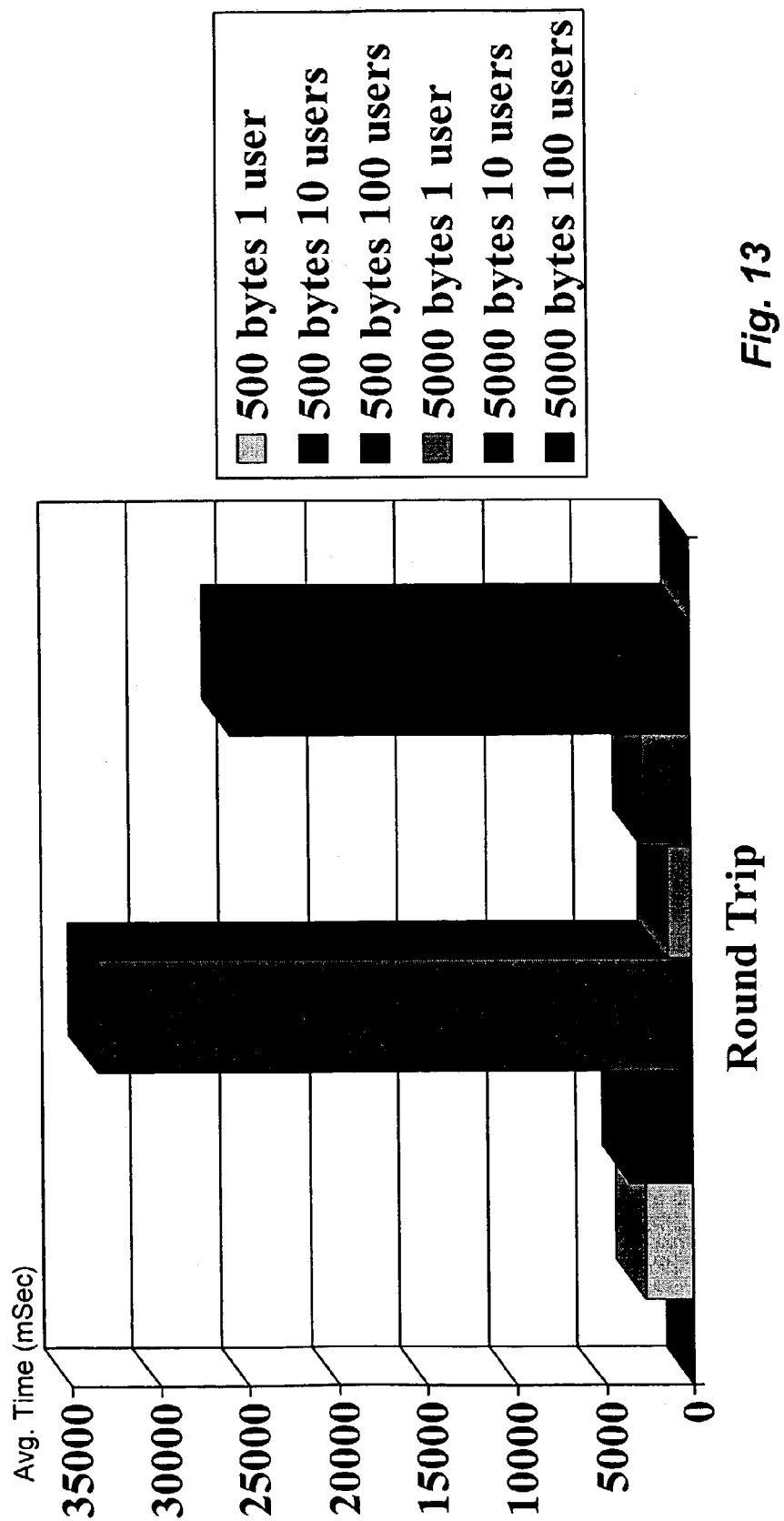
FIG. 13 shows an example of a graphical simulation report showing average round trip propagation times for simulated events according to a hub topology in accordance with embodiments of the invention.
Figure 14:
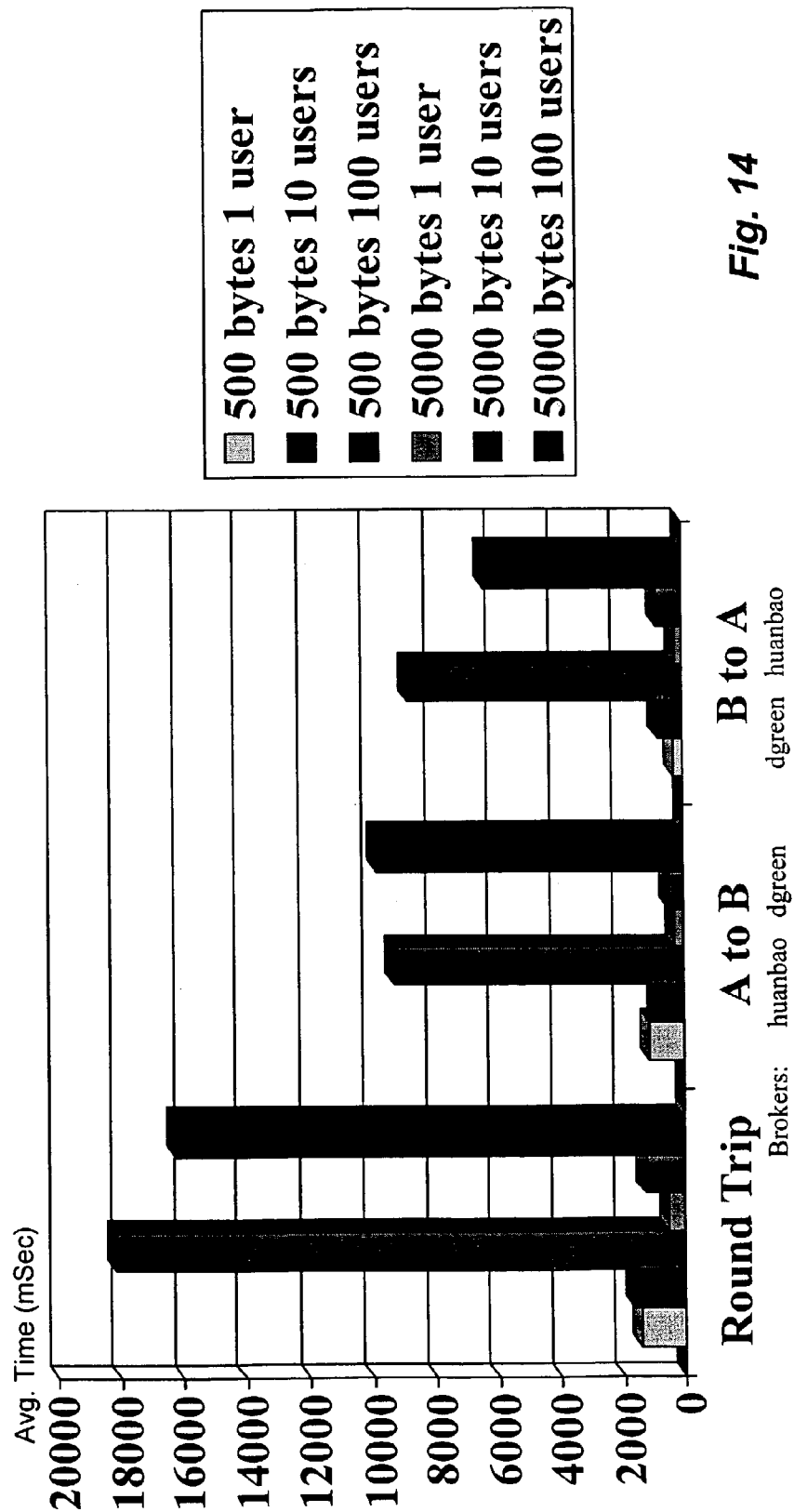
FIG. 14 shows an example of a graphical simulation report showing average propagation times between two enterprise nodes for simulated events according to a hub topology in accordance with embodiments of the invention.

FIGS. 9, 10, 13, and 14 show example graphics reports which may be produced by simulation module 306 providing a graphical indication of simulated event propagation times discussed above with respect to FIGS. 8 and 12. FIG. 9 shows an example graphical report 103 indicating the average round trip time for a message in a given circular topology simulation for messages of varying lengths (e.g., in bytes) and different numbers of users. FIG. 10 shows an example graphical report 103 indicating the average round trip time and directional transmission times between processes for a message in a given circular topology simulation for messages of varying lengths and different numbers of users in the simulation. FIGS. 13 and 14 are example graphical reports 103 for a hub and spoke topology showing the same information as FIGS. 9 and 10, respectively.

Control may then proceed to 1535, at which a method 1500 may end.

Thus, an event monitoring system and method has been shown. The at least one embodiment of the event monitoring system may utilize a computer-based event monitor, and may further include an event flow simulator, as well as a historical event viewing capability. Embodiments of the event monitoring system and methods described herein may provide enterprise personnel such as, for example, operational support teams a tool for monitoring data events that flow through an integrated application/system environment, or enterprise. The event monitor may output to the user an incoming events list of data events. These data events may be associated with a particular work order in order to allow users to quickly identify related data events to facilitate troubleshooting activities. In at least one embodiment, the event monitoring system and methods may utilize a computer-based event monitor, and may further include an event flow simulator, as well as a historical event viewing capability.

While the invention has been described with reference to the certain illustrated embodiments, the words which have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and materials, such as are within the scope of the appended claims.

What is claimed is:

1. An event monitoring system comprising:
    a computer system including a processor, the computer system being connected to a plurality of enterprise brokers;
    the event monitoring system including a simulation module configured to determine propagation times for simulated events flowing though at least some of the plurality of enterprise brokers, according to at least one communication topology; and
    the event monitoring system including an event monitor coupled to the at least some of said plurality of enterprise brokers using a network and configured to receive data event information from the at least some of the enterprise brokers connected thereto, wherein
    the event monitor is configured to generate an incoming events list including the data event information received from the at least some of the enterprise brokers connected thereto, and to further generate an historical events list based on user input date event parameters in response to a user selection, and wherein
    the event monitor includes a user interface configured to output the incoming events list, simulation results, and historical events list to a user.

2. The event monitoring system of claim 1, further configured to maintain connections to the at least some of said plurality of enterprise brokers.

3. The event monitoring system of claim 2, wherein the event monitor further comprises:
    a listener associated with each of the connections, each said listener being configured to detect a desired set of data events.

4. The event monitoring system of claim 1, further comprising an event database operably coupled to the event monitor, and wherein the event monitor is further configured to store data events using the event database.

5. The event monitoring system of claim 1, in which the event monitor is further configured to simulate a flow of data events throughout an enterprise.

6. An event monitor comprising:
a computer system including a processor, the computer system being connected to a plurality of enterprise brokers using a network,
the computer system further including a server listener module and a corresponding client listener module for each enterprise broker connection,
wherein each client listener module is configured to detect data events flowing through a corresponding enterprise broker, the computer system further including an event tracking module to configure the processor to receive data event information from at least some of the enterprise brokers via the network and to generate an incoming events list including the data event information received from the enterprise brokers,
the computer system further including a simulation module to configure the processor to determine propagation times for simulated events flowing though at least one enterprise broker and at least one enterprise broker client or application according to at least one communication topology, the event tracking module further configured to cause the processor to generate an historical events list based on user input data event parameters in response to a user selection,
the computer system further including a user interface module to configure the processor to output at least some of the incoming events list, simulation results, and historical events list to a user.

7. The event monitor of claim 6, further comprising an event database including a broker connections property file containing broker connection information, and wherein the processor is further configured to store data events using the event database.

8. The event monitor of claim 6, wherein the user interface module further includes a graphical user interface, the graphical user interface being configured to output a monitor page containing the incoming events list to the user.

9. The event monitor of claim 6, wherein the simulation module is further configured to compare propagation times and includes a simulation report generator.

10. The event monitor of claim 6, wherein the event tracking module data event parameters further include a work order number.

11. An event monitoring method comprising, at an event monitoring device:
establishing connections between the event monitoring device and at least some of a plurality of enterprise brokers;
detecting the occurrence of one of a particular set of data events at the at least some of said plurality of enterprise brokers;
outputting data event information associated with the detected data event to the event monitoring device;
using a simulator to determine propagation times for simulated events flowing though the at least some of the plurality of enterprise brokers according to at least one communication topology;
generating an incoming events list including the data event information received from the at least some of said plurality of enterprise brokers;
generating an historical events list based on user input data event parameters in response to a user selection; and
outputting the incoming event list, simulation results, and historical events list to a user.

12. The method of claim 11, further comprising:
maintaining a persistent copy of the data event information at the event monitoring device;
storing the data event information using a database; and
updating an incoming events list in response to receiving the detected data event.

13. The method of claim 12, wherein the updating the incoming events list is performed in response to said event monitoring device receiving new data event information from at least one of said plurality of enterprise brokers.

14. The method of claim 12, wherein the updating the incoming events list is performed periodically.

15. The method of claim 12, wherein the outputting the incoming events list to the user is accomplished using a graphical user interface.

16. The method of claim 11, further comprising:
simulating a flow of simulated data events throughout an enterprise according to at least one communication topology;
determining propagation times of said simulated data events; and
comparing the propagation times of said simulated data events.

17. The method of claim 11, further comprising generating an historical events list based on user input data event parameters in response to a user selection.

18. The method of claim 11, wherein the detecting is accomplished using a listener module in said event monitoring device.

19. The method of claim 11, wherein the establishing a connection includes reading a broker connections property file containing broker connection information.

20. An event monitoring system having at least one processor, said event monitoring system comprising:
an event monitor including a computer system; and
a plurality of enterprise brokers coupled to the event monitor using a network, each of the enterprise brokers including a client listener module configured to detect the occurrence of data events at the respective enterprise broker, each enterprise broker coupled to at least one broker client or application using the network, wherein the event monitor is configured to receive data event information from each enterprise broker connected thereto via the listener module, and to generate an incoming events list including the data event information received from each of the enterprise brokers connected thereto;
a simulation module configured to determine propagation times for simulated events flowing though at least one of the plurality of enterprise brokers and the at least one broker client or application according to at least one communication topology;
an event tracking module configured to generate an historical events list based on user input data event parameters in response to a user selection; and
a user interface configured to output the incoming events list, simulation results, and historical events list to a user.

21. The event monitoring system of claim 20, further comprising an event database operably coupled to the event monitor, and wherein the event monitor is further configured to store data events using the event database.

22. The event monitoring system of claim 20, in which the event monitor is further configured to simulate the flow of data events throughout an enterprise.

23. A computer-readable storage medium upon which is embodied a set of programmable instructions that when executed cause a processor to:
establish connections to a plurality of enterprise brokers;
detect the occurrence of one of a particular set of data events at at least one of said enterprise brokers;

output data event information associated with the detected data event to an event monitor;

use a simulator to determine propagation times for simulating events flowing though the at least one of said enterprise brokers according to at least one communication topology;

maintain a persistent copy of the data event information at the event monitor;

store the data event information using a database;

generate an incoming events list including the data event information received from the at least one of said enterprise brokers;

update the incoming events list in response to receiving the detected data event;

simulate events flowing though the at least one of the plurality of enterprise brokers;

generate an historical events list based on user input data event parameters in response to a user selection; and output the incoming event list, simulation results, and historical events list to a user.

24. The computer-readable storage medium of claim 23, further configured to cause the processor to update the incoming events list in response to receiving new data event information.

25. The computer-readable storage medium of claim 23, further configured to cause the processor to update the incoming events list periodically.

26. The computer-readable storage medium of claim 23, further configured to cause the processor to:

simulate the flow of simulated data events throughout an enterprise according to at least one communication topology;

determine the propagation times of simulated data events; and compare the propagation times of simulated data events.

27. The computer-readable medium of claim 23, further configured to cause the processor to generate a historical events list based on user input data event parameters in response to a user selection.

28. The computer-readable storage medium of claim 23, further configured to cause the processor to establish a connection includes to one or more enterprise brokers by reading a broker connections property file containing broker connection information.

* * * * *